(12) United States Patent
Bunyan

(10) Patent No.: US 10,025,467 B1
(45) Date of Patent: Jul. 17, 2018

(54) MULTI-LAYER INCREMENTAL TOOLBAR CONFIGURATION SYSTEM

(71) Applicant: Cadence Design Systems, Inc., San Jose, CA (US)

(72) Inventor: Graeme Bunyan, San Jose, CA (US)

(73) Assignee: Cadence Design Systems, Inc., San Jose, CA (US)

(*) Notice: Subject to any disclaimer, the term of this patent is extended or adjusted under 35 U.S.C. 154(b) by 217 days.

(21) Appl. No.: 13/918,567

(22) Filed: Jun. 14, 2013

Related U.S. Application Data

(60) Provisional application No. 61/821,659, filed on May 9, 2013.

(51) Int. Cl.
| | |
|---|---|
| G06F 3/0484 | (2013.01) |
| G06F 8/65 | (2018.01) |
| G06F 8/71 | (2018.01) |
| G06F 9/445 | (2018.01) |

(52) U.S. Cl.
CPC .............. *G06F 3/0484* (2013.01); *G06F 8/65* (2013.01); *G06F 8/71* (2013.01); *G06F 9/44505* (2013.01)

(58) Field of Classification Search
CPC .. G06F 9/4443; G06F 3/0484; G06F 9/44505; G06F 9/44536; G06F 8/71; G06F 8/65; H04N 1/00501; H04N 1/00503; H04N 1/00506; H04N 1/00509; H04N 1/00511; H04N 1/00514
See application file for complete search history.

(56) References Cited

U.S. PATENT DOCUMENTS

| | | | | |
|---|---|---|---|---|
| 6,098,098 | A * | 8/2000 | Sandahl | H04L 41/082 709/221 |
| 8,028,243 | B1 * | 9/2011 | O'Riordan | 715/765 |
| 8,122,377 | B2 * | 2/2012 | Jindal et al. | 715/826 |
| 8,302,014 | B2 * | 10/2012 | Lezama Guadarrama | G06F 9/4443 715/744 |
| 2001/0052121 | A1 * | 12/2001 | Masuda | G06F 8/60 717/170 |
| 2002/0100017 | A1 * | 7/2002 | Grier | G06F 8/54 717/120 |

(Continued)

*Primary Examiner* — Kieu Vu
*Assistant Examiner* — Blaine T. Basom
(74) *Attorney, Agent, or Firm* — Hunton Andrews Kurth LLP

(57) ABSTRACT

A system, method, and computer program product for automatically managing control configurations in an application graphical user interface (GUI). Interface element specifications may be configured via a customized overlay file corresponding to at least one party having influence over the application controlled by the GUI, such as an application vendor, a user group, and an individual user. The overlay file is created and saved via an interface manager GUI that allows new interface elements such as toolbars and toolbar buttons to be added, and existing interface elements to be modified, but does not allow existing default interface elements to be destructively edited, only hidden or visibly disabled. The overlay file is processed during program environment startup and when user actions trigger a separate application or feature window activation or reset a particular overlay file's modifications. Compatibility with vendor-supplied default interfaces and other overlay file based customizations is maintained.

27 Claims, 33 Drawing Sheets

(56) References Cited

U.S. PATENT DOCUMENTS

| | | | | |
|---|---|---|---|---|
| 2006/0101053 A1* | 5/2006 | Proctor | ............... | G06F 9/44505 |
| 2007/0076628 A1* | 4/2007 | Li | ....................... | H04L 41/0843 |
| | | | | 370/254 |
| 2009/0064090 A1* | 3/2009 | Anonsen et al. | ............. | 717/104 |
| 2009/0205013 A1* | 8/2009 | Lowes | ............... | 726/1 |
| 2011/0276908 A1 | 11/2011 | O'Riordan | | |
| 2012/0254761 A1* | 10/2012 | DeWitt | ............ | H04N 21/47205 |
| | | | | 715/733 |

\* cited by examiner

```
( ;; Opening bracket for toolbar file
  ( ;; Inherit toolbars from base-level app
      nil
      inheritToolbarsFrom "Layout"
  )

(
      nil
      name    vlsxl_Toolbar
      text    "Layout XL Toolbar"
      items (
         ( nil
           type action
           name      xlCreateToolbarGFS
           text      "Generate All From Source"
           iconFile  "layout-generate-from-source.png"
           callback  "lxHiReInitDesign()"
           enableCondition   editable
         )
      ) ;;; More actions for vlsxl_Toolbar
  ) ;; More toolbars for this application
) ;; Closing bracket
```

FIG. 5

```
( ;; Opening bracket for toolbar file
  (
   nil
   name vlsxl_Toolbar
   items (
     ( nil
       name     xlCreateToolbarGFS
       iconFile "user-specified-icon.png"
       callback "user-specified-callback()"
     )
   ) ;;; More actions for vlsxl_Toolbar
  ) ;; More toolbars for this application
) ;; Closing bracket
```

```
( ;; Toolbars for application "Layout"
  (
    ;; Toolbar "View"
    nil
    name        leViewToolbar
    meta ( nil
      hidden (
        (nil name leViewToolbarZoomIn time (1368051787 618429) )
        (nil name leViewToolbarZoomSelected time (1368051987 837001) )
      )
    )
    items nil
    ;; End toolbar "View"
  )
  (
    ;; Toolbar "Create"
    nil
    name        leCreateToolbar
    meta ( nil
      moved (
        (nil name leViewToolbarZoomIn index 1 time (1368051787 622014) )
        (nil name createElaborateBlobToolbarItem index 5 time (1368052078 279680) )
      )
    )
    items
    (
      ( ;; "Create" > "Create Elaborate Blob"
        nil
        type       action
        name       createElaborateBlobToolbarItem
        callback   "createElaborateBlob(?size 'huge)"
        checkable  nil
        disabled   nil
        iconFile   "AddDummy.PNG"
        invisible  nil
        text       "Create Elaborate Blob"
      )
    ) ;; end items
    ;; End toolbar "Create"
  )
) ;; End toolbars for application "Layout"
```

FIG. 22

```
( ;; Toolbars for application "Layout"
  (nil meta ( nil
    moved (
      (nil name myToolbar index 13 time (1368053035 246101) )
    )
  ))
  (
    ;; Toolbar "View"
    nil
    name        leViewToolbar
    meta ( nil
      hidden (
        (nil name leViewToolbarZoomIn time (1368051787 618429) )
        (nil name leViewToolbarZoomSelected time (1368051987 837001) )
      )
    )
    items nil
    ;; End toolbar "View"
  )
  (
    ;; Toolbar "Create"
    nil
    name        leCreateToolbar
    meta ( nil
      hidden (
        (nil name createElaborateBlobToolbarItem time (1368053326 310027) )
      )
      moved (
        (nil name leViewToolbarZoomIn index 1 time (1368051787 622014) )
        (nil name createElaborateBlobToolbarItem index 5 time (1368052078 279680) )
      )
    )
    items nil
    ;; End toolbar "Create"
  )
```

*(Continued from FIG. 30A)*

```
(
   ;; Toolbar "Guardring"
   nil
   name           lebGuardRingToolbar
   meta ( nil
      hidden (
         (nil name leGRToolbarReshape time (1368053414 660006) )
      )
   )
   items nil
   ;; End toolbar "Guardring"
)
(
   ;; Toolbar "Favorites"
   nil
   name           myToolbar
   text           "Favorites"
   visibleCondition  ""
   meta ( nil
      moved (
         (nil name createElaborateBlobToolbarItem index 0 time (1368053326 309993) )
         (nil name leGRToolbarReshape index 1 time (1368053414 662568) )
      )
   )
   items
   (
      ( ;; "Create" > "Create Elaborate Blob"
         nil
         type        action
         name        createElaborateBlobToolbarItem
         callback    "createElaborateBlob(?size 'huge)"
         checkable   nil
         disabled    nil
         iconFile    "AddDummy.PNG"
         invisible   nil
         text        "Create Elaborate Blob"
      )
   ) ;; end items
   ;; End toolbar "Favorites"
)
) ;; End toolbars for application "Layout"
```

FIG. 30B

MULTI-LAYER INCREMENTAL TOOLBAR CONFIGURATION SYSTEM

CROSS REFERENCE TO RELATED APPLICATIONS

The present application is a non-provisional application that claims the benefit of provisional application U.S. Ser. No. 61/821,659, filed on May 9, 2013 and entitled "Multi-Layer Incremental Toolbar Configuration System", which is hereby incorporated by reference in its entirety. The present application is related to commonly assigned U.S. Patent Application Publication No. 2011/0276908A1, filed on May 6, 2010 as U.S. Ser. No. 12/775,273, and entitled "System And Method For Management Of Controls In A Graphical User Interface", published on Nov. 10, 2011. This related patent application is hereby incorporated by reference in its entirety.

BACKGROUND

Graphical user interfaces (GUIs) have become essential aspects of many computer applications and operating systems. Graphical controls may be provided in GUIs to trigger functions of application programs when a particular interface element is activated by a user. These graphical controls may be selectable buttons or other known interface elements.

The graphical controls may be arranged into a toolbar, which is a collection or strip of selectable buttons. The buttons are often icons containing distinct and easily recognized symbols or images that correspond with the functions they control. Buttons save space compared with textual descriptors. Toolbar based commands are generally invoked directly with a single click, so they are faster to use than menus or other interface elements that require additional navigation or input.

Toolbars are usually arranged in vertical columns or horizontal rows on the edges of a display window, and are often constrained in their position, such as directly below a standard menu bar. Computer operating systems may also include toolbars, usually at the top or bottom of the screen. Some toolbars are designed so users may reposition them on the screen for greater efficiency, or hide them altogether. The screen space required by a toolbar is generally proportional to the number of its displayed buttons. Useful screen space may be compromised by having too many toolbars, so typical toolbars present only the most frequently used application commands.

In electronic design automation (EDA), designs for integrated circuits (ICs) and circuit boards may be created and edited using computer displayed images and graphical controls, often in many separate applications. EDA tools may be extremely complex, reflecting the complexity of typical modern design processes. The manageability of EDA user interfaces has accordingly become increasingly important.

User interfaces for design tools may need to support multiple configurations to accommodate the various complex design tasks required. Conventional GUIs are however not always equipped to enable interface configuration to the extent needed for EDA tools. Current interfaces may not readily allow the various involved parties (e.g., software vendors, design firms, and individual users) to each customize their own toolbar or other interface element configurations in a compatible way.

Software vendors may for example periodically upgrade their products with bugfixes or with entirely new versions having better interfaces. Any interface customizations made by circuit designers and design firms that overwrite or otherwise destructively edit the new vendor provided interface control files may cause the software to behave in unintended ways. Yet designers and design firm computer aided design (CAD) groups often adapt vendor supplied EDA applications into a design framework in a customized or "aftermarket" fashion. Such assembly of various applications into a coherent design flow may help design firms streamline their designers' specific design activities in a more coordinated and efficient way.

In some cases, CAD groups and individual users may manually edit relevant interface control files to achieve limited control over interface configuration. This practice is however inconvenient and somewhat risky for all involved. Users may not have the programming skills to successfully customize an interface themselves, nor the authorization or permission of their CAD groups to even try. Further, improperly edited control files may prevent proper tool operation. This problem may lead to increased customer support calls to the software vendor, or potentially invalid output by the modified programs.

Accordingly, the inventor has developed a novel system to enable multi-layer configuration and incremental management of toolbars and other interface elements in application graphical user interfaces.

BRIEF DESCRIPTION OF THE DRAWINGS

FIG. 5 is an interface control file, according to an embodiment.

FIGS. 11-32 are diagrams of usage scenarios for the interface manager and related overlay files, each according to an embodiment.

DETAILED DESCRIPTION

This application presents a system, method, and computer program product for automatically configuring toolbars and other interface elements in a graphical user interface. An interface manager GUI enables easy customization of default interface configurations provided by software vendors. Software vendors, user groups, and individual users may specify application interface modifications with the interface manager GUI, which then creates overlay files that describe the desired configuration modifications.

The overlay files may be stored separately from the interface control files provided by software vendors, and may use different file suffixes to prevent the vendor provided interface control files from being directly modified. The overlay files may be processed during the startup of a design environment, a specific application, or a new application window, but are designed to prevent any destructive alteration of the default interface control files. Overlay files may be processed according to a predefined hierarchical prioritization algorithm; for example overlay files provided by a software vendor may be processed first, then those created by a user group, then those from a particular user. Users may also create overlay files for use only with a particular project using the interface manager GUI.

Overlay files may implement desired interface customizations that may generally add, modify, hide, or reorder interface elements, such as toolbars and toolbar buttons. (Toolbars and their buttons are used throughout this application as exemplary but non-limiting interface elements. Similarly, interface control files may be referred to as toolbar files.) For example, a user may add a toolbar, modify an existing toolbar's definition, hide a toolbar that is not used frequently, add buttons to a toolbar, and reorder the buttons in a toolbar, all by specifying desired changes via the interface manager GUI. The exemplary toolbar button's definition may include the symbol or image it depicts, default values it uses, or the toolbar button's callback (i.e., the specific program function to be called when the button is selected).

In one embodiment, interface configurations may be controlled by text control files, such as SKILL files or XML files, though the invention is not limited to such examples. The overlay files that govern the application interface modifications desired are created by the interface manager GUI and may be of a similar file type, or other file types as may be known in the art. Instructions submitted via the interface manager GUI to for example delete a toolbar or a toolbar button may instead result in the customized interface actually having a hidden toolbar, or buttons that are hidden or visibly disabled (e.g., grayed-out or crossed-through). The default interface commands may remain accessible however, via a "restore default" command or a reset button that may let a user effectively ignore configuration changes specified in an overlay file.

Figure 1:
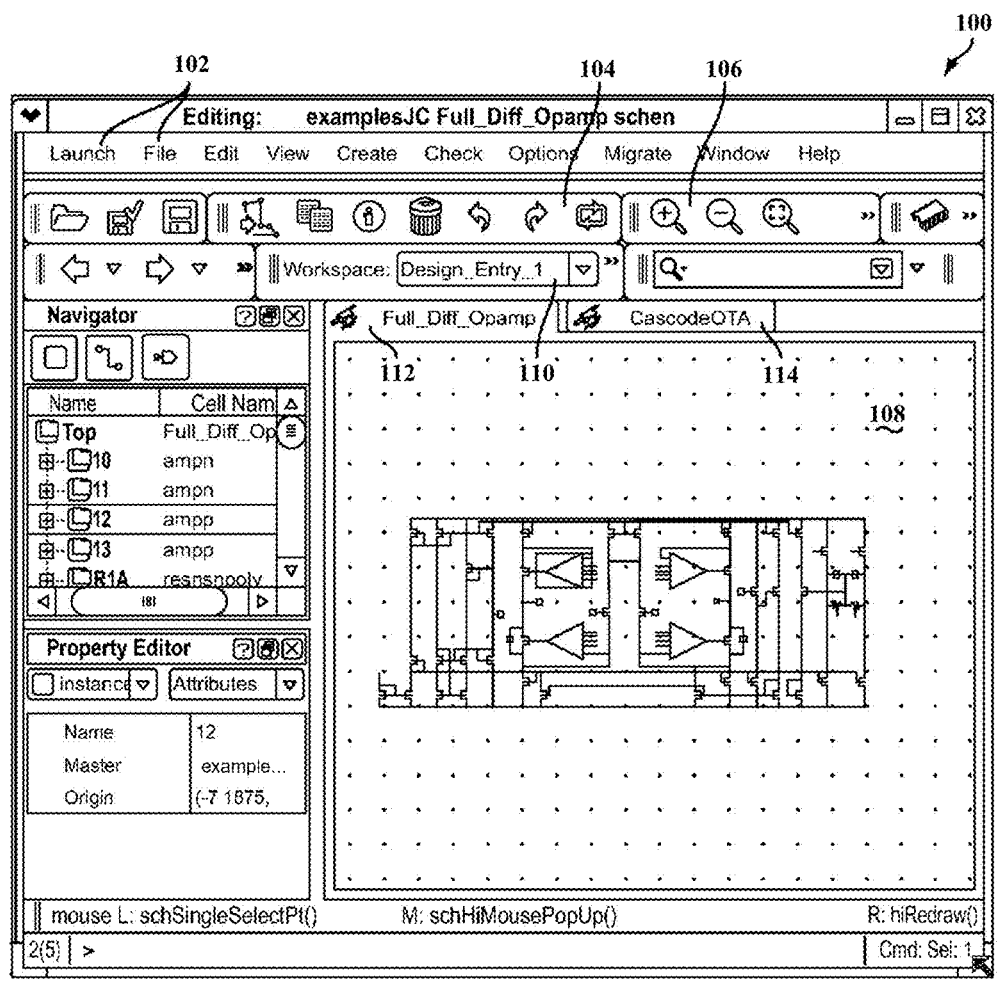
FIG. 1 is an application graphical user interface including toolbars, according to an embodiment.

FIG. 1 shows an application graphical user interface (GUI) 100 including some exemplary toolbars, according to an embodiment. A menu bar 102 is positioned at the top of the interface, and includes text descriptions that may each expand into a set of menu options, as is well known in the art. Toolbars 104 and 106 are shown positioned below menu bar 102, and each may contain a number of toolbar buttons. Each button may include a depiction of an image or symbol enabling easy visual recognition of its associated application command. Each button may be selected by a cursor device such as a mouse, generally with a single click.

A main display area 108 depicts in this example a circuit design under development. Other interface elements are located around the main display area, such as box 110, which includes a text label and a pull down selector menu that in this instance allows a user to choose from a number of workspaces. Tabs 112 and 114 enable a user to quickly switch between displays, which for example may include different circuits being designed.

Application GUI 100 may be familiar to the computer user of ordinary skill in the art, but the complexity of interface items and their underlying functions or related data may be surprising to one not familiar with modern circuit design practice or EDA tools. A circuit designer may need to manage the schematic capture, layout, and simulation of a large number of cells or circuits in an overall design, for example. A variety of commands and relevant data are represented in a concise, space saving way in such an interface. The commands and data that are needed for a given application or task may however be overwhelmed by others that are less relevant.

While software vendors design their interfaces to allow easy operation in a typical use situation, design firms and individual users often prefer to customize their interfaces for their particular design scenarios. The customization methods currently available to software customers are limited and are in need of improvement. Management of multiple levels of interface configuration for example has not been found in the prior art. Known applications generally provide a single vendor provided system setup, and then only allow user modifications to that single setup.

Further, such modifications may not be especially simple. In one prior art tool suite, users may only customize software vendor provided toolbars by editing the vendor's files with a text editor in a specific directory. The vendor's toolbars are deployed as text files, in this instance written in the SKILL language. CAD groups may perform such customizations for their designers, to override or augment the default toolbars provided.

However, as soon as a prior art interface control file is edited to customize the interface, the edited file effectively freezes the current version of the interface, as changes in the system toolbars (i.e., any toolbars in the usual installation hierarchy) are no longer detected. Thus, further changes from the software vendor may not be incorporated unless the user manually merges them into the modified text file that controls the interface. If a CAD group updates their designers' toolbars, or if a user upgrades to a new software release and a new vendor provided toolbar contains new or different elements, the user who customized her toolbars may not actually see them. Moreover, the user will not even be aware there is a compatibility problem. This situation is difficult for both users (who must manually keep these changes up to date) and the software vendor (who must remotely debug issues related to a local customization).

The embodiments of the present invention resolve these shortcomings by meeting several constraints or desired objectives for such design tools:

The existing interface control files are still usable.

An interface management GUI allows the user to customize application toolbars and other interface elements.

The user is able not only to add new toolbars and items, but also to modify (change/show/hide) existing items, even if the user does not have sufficient permission to write to the control files in which these items are defined.

The changes the user makes are as minimal and precise as possible, so that changing an interface element does not result in subsequent changes at the system level being blocked.

The software vendor's configuration facility mechanism, which allows for extensive file customization, is respected. Users and CAD group administrators may customize which directories are searched for files. The embodiments preferably collect and aggregate these incremental changes such that the resulting application GUI item is a composite of the original item description and any user changes found in files in the configuration search path.

Embodiments of the present invention provide a GUI wrapper around the interface control files, allowing simple user configuration of toolbars and toolbar items. The embodiments accomplish this with two new features:

An interface manager GUI to allow multi-layer customization of interface control files in a more intuitive manner.

An overlay file to allow incremental changes to be saved.

The embodiments are designed to make interface customization as transparent as possible to the user, and to eliminate the need for manually editing text based interface control files to configure an application GUI. After initialization, the embodiments provide the usual application functions during normal operation. At various and appropriate times during program execution, particular user actions may occur that cause the embodiments to determine that new collections of controls need to be created. For example, the user may open a new window, open a new tab within a window, or may open the interface manager directly to customize the application interface.

Figure 2:
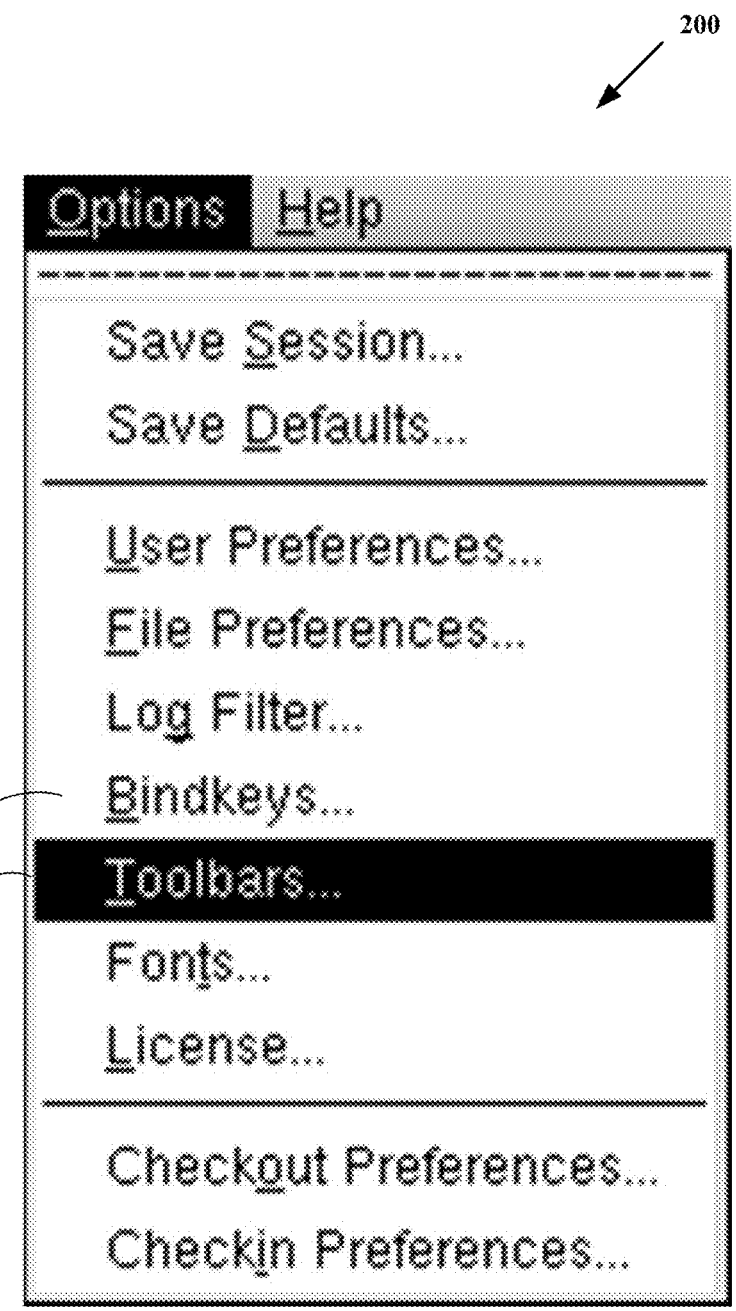
FIG. 2 is a command interpreter window for invoking an interface manager GUI, according to an embodiment.
Figure 3:
FIG. 3 is a graphical window for invoking an interface manager GUI, according to an embodiment.

The interface manager GUI may be invoked from an ordinary command interpreter window or from regular software environment based application windows. For a command interpreter window 200 as shown in FIG. 2, the interface manager may be available under Option>Toolbars . . . , shown as item 202 adjacent to Options>Bindkeys, item 204, which provides similar functionality for key bindings. For a standard software environment based graphical window 300 as shown in FIG. 3 (e.g., Layout, Symbol, and Schematic applications provided by a vendor), the interface manager 302 may be available under the standard window menu. Further, the interface manager may be invoked by right clicking a toolbar item in an application GUI for example (not shown).

Figure 4:
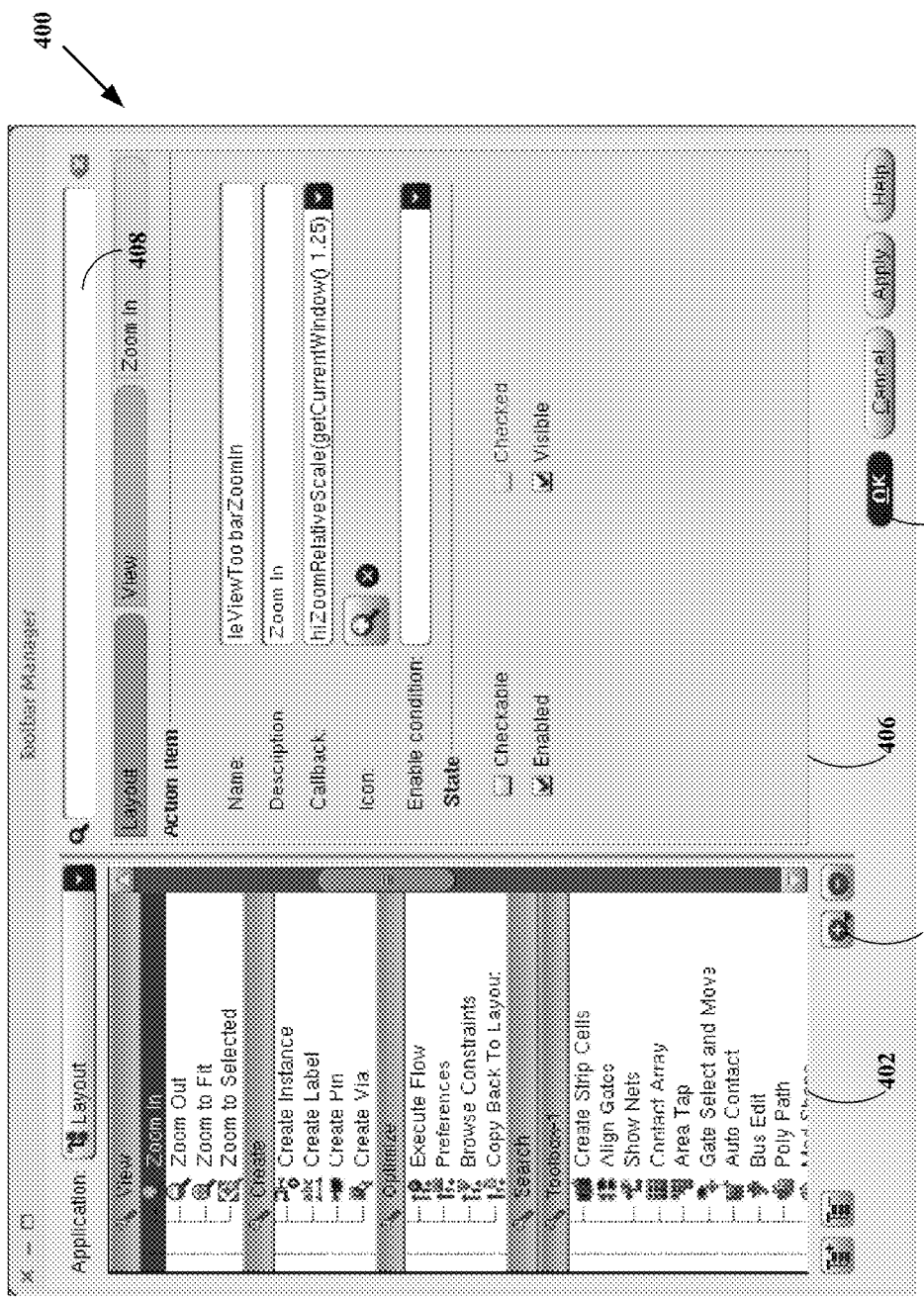
FIG. 4 is an interface manager GUI, according to an embodiment.

FIG. 4 shows an interface manager 400 GUI, according to an embodiment. In this example, the shortcut menu on the "Zoom In" toolbar item was used to invoke the interface manager 400. All toolbar items may be organized in a logical toolbar tree structure 402 in a pane on the left side of the interface manager 400 GUI. New user defined items may be added simply by pressing the "+" button 404 below the tree 402. Existing items may be moved by dragging and dropping for example. Items may be modified by entering data in the fields shown on the right side data area 406. Exemplary data may include a toolbar name, callback function, icon, and various attribute states, etc. If the user input is accepted, it will be added to the user's overlay file for reuse in toolbars and menus. The full description of a new action or toolbar is saved in the overlay file, under the toolbar on which it is placed.

The list of actions in the tree 402 may be searched by entering text in the filter box 408 shown in the upper right. Text entered here is applied as a filter to the tree 402, and the tree 402 is updated in place to show only those actions which match the filter. Similar to most standard search widgets, clearing the filter box 408 by deleting the text or clicking the "X" button which appears during a filter operation cancels the filter operation and restores the tree 402.

The user may thus use the interface manager 400 to select buttons to remove from a toolbar and/or add selected buttons to a toolbar. The user may then select another toolbar and repeat the operation for that toolbar. When the user is finished with the interface manager (e.g., selects the OK button 410), the interface manager 400 saves at least one overlay file and exits. The interface manager 400 thus allows a user to customize groups of controls in a graphical user interface without needing detailed programming knowledge. Detailed examples of interface manager 400 use scenarios are provided further below.

FIG. 5 shows an interface control file (or toolbar file) 500, according to an embodiment. In one embodiment, this is a SKILL file, but XML files or other file types are also within the scope of the present invention. Text entries after the double semi-colons in each line are comments. This file for example defines a toolbar named vlsxl_Toolbar that uses an icon image file layout-generate-from-source.png and when selected uses function lxHiReInitDesign( ) as its callback. Although this file includes only one toolbar, it is possible to include many toolbars in a single file 500.

Figure 6:
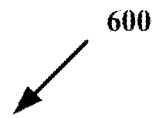
FIG. 6 is an overlay file, according to an embodiment.

FIG. 6 shows an overlay file 600, according to an embodiment. In one embodiment, this is a SKILL file like interface control file 500, but XML files or other file types are also within the scope of the present invention. This file redefines a system toolbar item named xlCreateToolbarGFS to now use an icon image file user-specified-icon.png, and when selected, to now use user-specified-callback( ) as its callback, for example. Although this overlay file includes only one toolbar overlay, it is possible to include many toolbar overlays in a single overlay file 600. Further, multiple overlay files 600 may be created to customize an application interface.

The concept of an overlay file is introduced to limit the migration problems that occur when editing interface control files, so backward compatibility is retained. This feature allows the user to customize the vendor supplied toolbars without having to duplicate the entire interface control file 500. For each toolbar file 500 supplied by the software vendor, the edits may be stored in an overlay file 600 with the same name, but with a different suffix, or in a predetermined directory, to prevent previous software releases from trying to process it.

The overlay file 600 in one embodiment stores only those changes the user explicitly made to the interface configuration, such as changing a toolbar item's name or icon as shown in the example. The overlay file syntax may be similar to that of an interface control file, but with extra metadata to describe the changes made. Only the user's changes relative to the system interface control files may be put into the overlay file 600, in this embodiment.

Users need not interact directly with the overlay file 600, as in one embodiment all interaction with it may be accomplished via the interface manager 400 GUI, that encapsulates the particulars of the underlying files used to represent the toolbar system. Aside from the overlay file 600, which may be essentially an interface control file 500 with some extra information, no new file formats or data structures are required.

Thus, if a user hides a vendor provided toolbar button, the overlay file 600 would not need to save the entire toolbar definition, only a notation that "action X is hidden on toolbar Y" for example. In this way, the user hasn't destructively altered the system interface control file 500. The user has access only to an overlay file 600, so any new items that appear in the system toolbar will "filter through", since the system toolbar is the basis for what the user sees. If a new item appears and the user does not want to see it, then the user may of course hide it via a modification. Thus, in one embodiment the overlay file 600 may be a stripped down version of an interface control file that simply modifies the definition of an existing toolbar (e.g., hide action X, change order to Z, Y, X, add new item Q, etc.).

The feature of sparing vendor provided interface control files 500 by instead using overlay files 600 also relates to the loading of interface control files 500 when a software environment or application or application window is first initialized. Prior art toolbar mechanisms have used a search facility to find files, but the loading mechanism was quite basic. Such a search facility processed the interface control files during initialization and operation of the software environment. The search facility would search a file system for interface control files, for example in software vendor, CAD group, user, and project directories. The search facility thus determined which interface elements and element collections (such as toolbars) are defined in a search path.

The overlay file 600 of the present embodiments may be read using the existing file searching and loading mechanism, but in contrast with the prior art, in embodiments of the present invention all overlay files 600 may be loaded. This feature facilitates incremental configuration abilities. The overlay filename, like the interface control filename, may be derived from the name of the application being loaded. For example, when loading the "Schematics" application, a design software environment may look for the first "Schematics.toolbars" file in the search path, and all "Schematics.overlay" files (not just the first).

Figure 7:
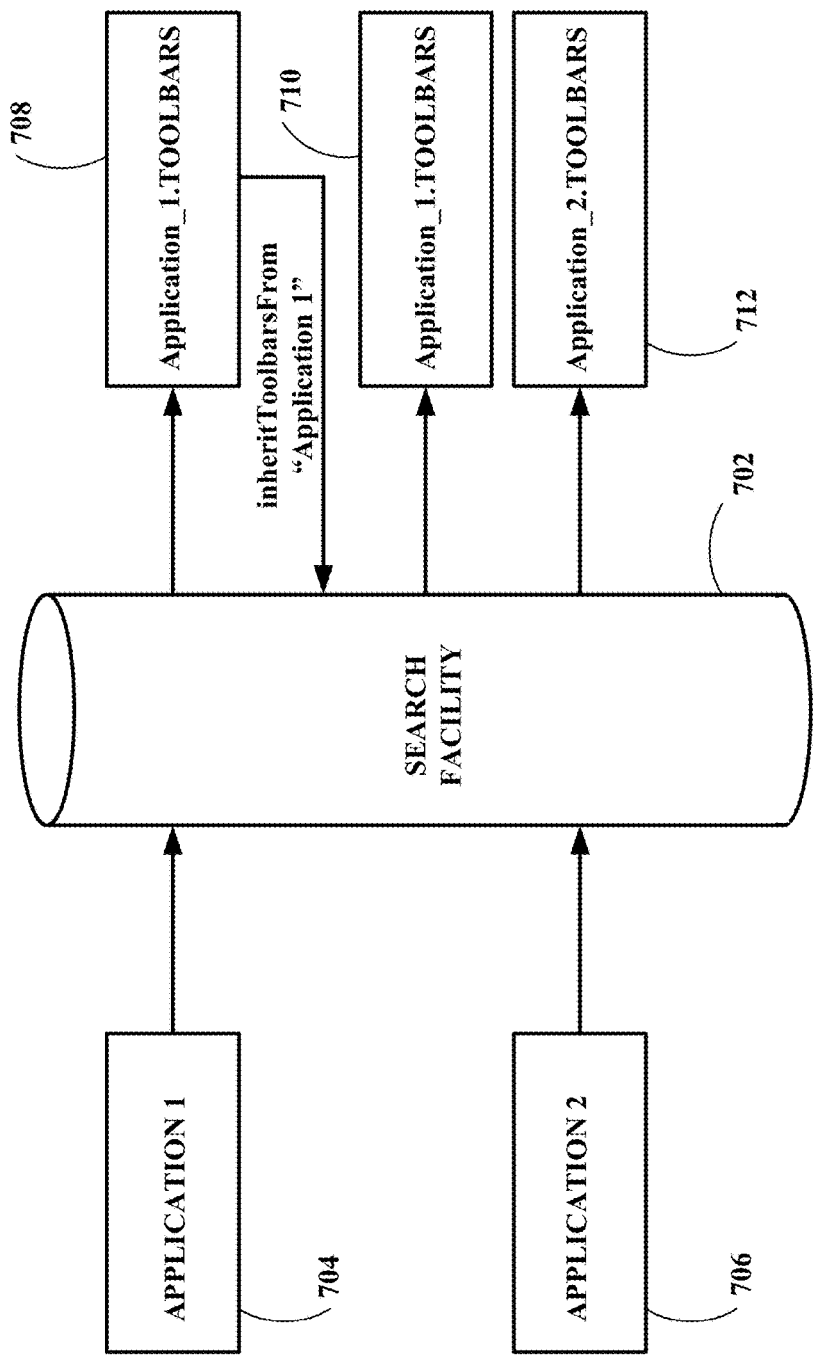
FIG. 7 is a diagram of a search facility that processes interface configurations for applications, according to an embodiment.

FIG. 7 shows a search facility 702 that processes interface configurations for applications, according to an embodiment. Search facility 702 for example may be called when a software environment or a user starts one or more applications; in this case two applications are shown, 704 and 706. Search facility 702 may read application control data from various directories that may be predetermined or linked via a chaining algorithm. Such control data may include not only toolbar files 500 but also data regarding site licenses or authorized product tiers etc. as may be known in the art. A toolbar dataset 708 for the first application 704 may be loaded into memory accordingly. Search facility 702 may then determine if there are any overlay files 600 that are intended to be used with the various applications being initialized. If so, then they may be inherited, and a revised toolbar dataset 710 may be loaded into memory accordingly. This process may be repeated for the second application 706 and its toolbar dataset 712, and any other applications that may need to be initialized.

The embodiments therefore require minimal changes to existing search facilities or other tools used for application and interface initialization. Furthermore, by leveraging the existing search facility methodology to find the overlay files 600, multiple levels of interface customization may be applied. CAD groups may customize vendor provided toolbars for their designers, and individual users picking up those customizations may then further customize these items. User definitions may override or live harmoniously with the prior customizations, as required to meet a user's own needs. A user may therefore change something in an interface without having to be aware of whether the software vendor defined it, whether it was customized by a design firm's CAD group, or if the user herself created it previously. No text editing is required. Overlay files may also be exchanged between different users, vendors, and user groups.

The embodiments thus allow not only simple changes to existing interface items, but allow the user to define entirely new toolbars and interface items, using the SKILL extension language in one embodiment. The user may then create a toolbar item for software vendor provided SKILL functions that are not already on a toolbar. XML files may also be used to similar effect.

The level of customization offered per item by the embodiments is quite extensive. Every facet of an interface item may be customized. If left uncustomized, the item will retain the system default, even if the vendor provided system default changes over time. In addition to the cosmetic interface item appearance (e.g., changing icons and showing/hiding items), the underlying function of an interface item may be changed by changing its callback. This feature allows CAD groups to easily modify a toolbar button to call an in house wrapper around the underlying software vendor function, for example, to perform extra design checks.

Providing multiple layers of customization, e.g., a vendor provided system file plus a CAD group's overlay file plus a user's overlay file, causes the internal change management to become more complicated. Since an overlay file's impact is relative to the file it's overriding, a change in an interface control file at a higher level can have unintentional effects further down the chain.

For example, suppose a user has a standard interface control in the software vendor installation hierarchy. The CAD group has a custom environment for layout engineers, so they want to be able to customize the default working environment so that users have quick access to these functions via toolbars. The user also has local customizations, since she hid the toolbar buttons she does not use, thereby freeing up precious display space. Further, the user added a few buttons to the software vendor's toolbars, since they logically belonged with the operations in those toolbars, and added her own toolbar with new actions she defined herself. If the user customizations are saved as an overlay file 600 referencing other interface control files 600 and actions, it should inherit some of the changes properly. That is:

If the system toolbars change order, and the user has not customized the order of this toolbar.
If a new item is added, the user will see it.
If an item is removed, it will disappear from the user's toolbar (the interface may either silently fail if a user file references a non-existing toolbar or toolbar item, or warn and provide a simple way in the GUI to clear out the reference from the toolbar overlay).
If an existing item has its definition (e.g., icon or callback) changed, the user will pick that up.

This is desirable behavior, but only if there is a single master interface control file to read in.

On the other hand, if there are multiple levels of overlay supported (e.g., CAD group and user), one overlay file may overlay another overlay file. Thus, the leaf level overlay file is working relative to an overlay file which itself is working relative to another file. The approach taken in one embodiment is to track and save only changes into the user's overlay files 600. Therefore this embodiment would read all overlay files 600 not in the user overlay directory directly into the toolbar table, since the user did not make those changes, and keep the user overlay separate so it can be written out to the user's overlay file 600.

An important distinction is made between user toolbar data, and all other toolbar data: only user data is fully editable:

User toolbars may be deleted.
User toolbar items may be deleted.

All other data may not be destructively edited, regardless of whether the user actually has write permission, as those files are considered read-only:

System toolbars may be hidden from existing workspaces, but not actually deleted (meaning they will still be instantiated by the software environment when the application is installed).
Toolbar items on system toolbars (other than those the user added, and which are saved in an overlay file 600) may be hidden, and placed in another location on the same toolbar, but not actually deleted. Moving system toolbars within an application requires special handling, to be described.

This use model of the embodiments ensures that toolbar items shipped by the software vendor are present at runtime, since the interface manager GUI does not allow them to be deleted. This approach does not prevent users from perpetuating the known scheme of copying and editing a toolbar control file 500, and manually removing vendor-provided toolbar items. However, that is not a use model that software vendors currently support, as some application code relies on named toolbar items being present, and will therefore break if this is not the case. This problem is resolved by simply not allowing actual deletion of system toolbar data.

In one embodiment, a reset button is provided to clear out user customizations. The reset button may trigger a reloading of all interface control files 500 and overlay files 600 other than the one specified, or other than those in a predetermined directory. The reset button will take the appropriate action depending upon which item is selected. For a user defined toolbar item, it will simply be deleted. For a system toolbar item, it will be hidden; the application GUI may represent this by showing the text in grayed-out or stricken-through or italicized fonts for example, but leaving it in place in the interface manager 400. This ensures that the user still has access to vendor provided toolbar items, even if the user does not want to see them by default. The user may un-hide them at a later date. The end result, however, is the same: whether deleted or hidden, the item is no longer shown on the toolbar once the changes in the application GUI are applied and saved.

Figure 8:
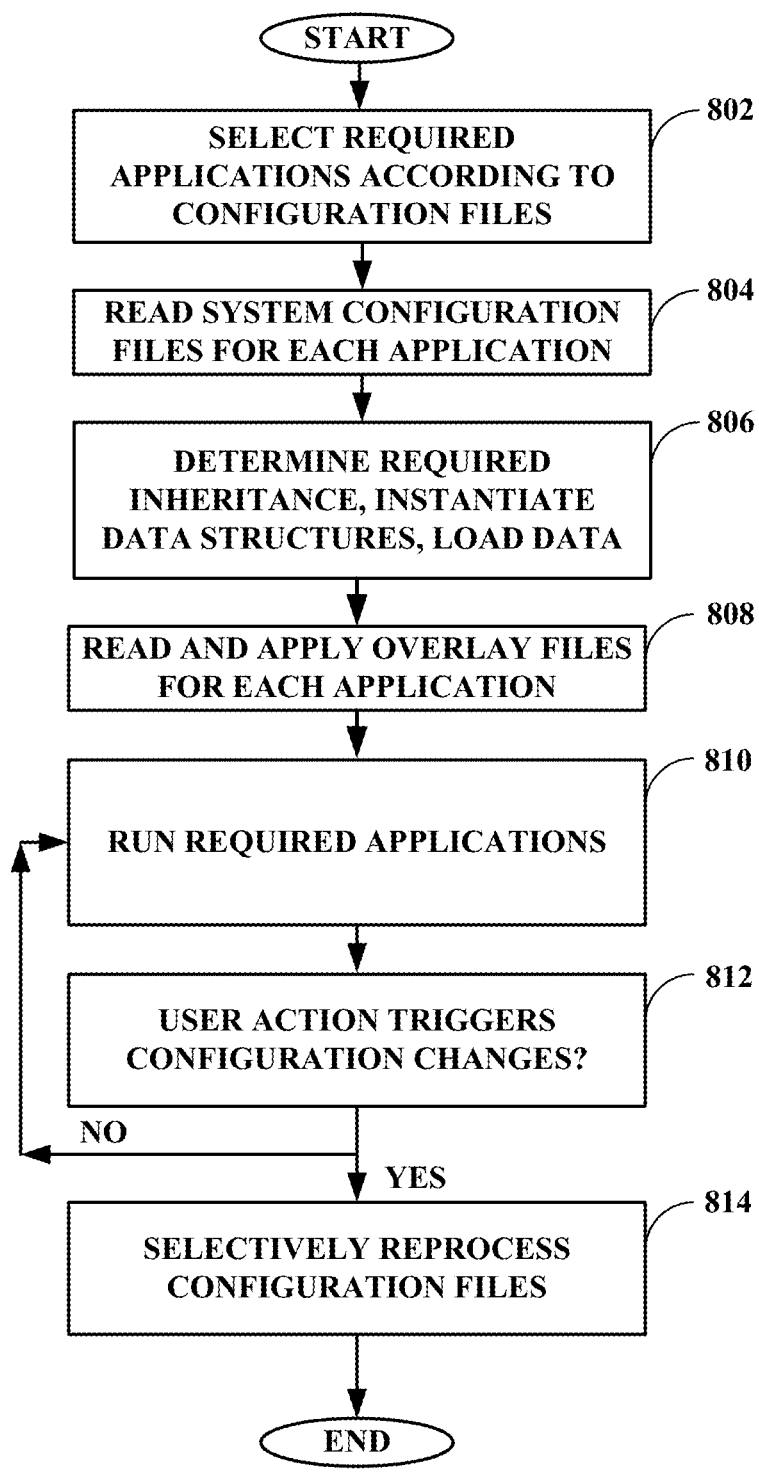
FIG. 8 is a flowchart of interface configuration file processing, according to an embodiment.

FIG. 8 shows a flowchart of configuration file processing, according to an embodiment. A search facility or other initiation tool may process configuration files for a number of specified applications required by a software environment, at 802. The applications required (or authorized) may depend on site licenses, product tiers, and particular combinations of applications specified for a particular user and hardware platform.

In one embodiment, the applications may be selected by the user when the user opens a cellview. For example, if the user opens or creates a new Layout cellview, then the Layout application will be opened. At that point, the toolbar information for that application may be loaded, including any files that are inherited and required to build a complete picture of the Layout toolbars. If the Layout application for example inherits some toolbars from a Toolbox application, using an inheritToolbarsFrom directive in the Layout.toolbars file for example, then Toolbox.toolbars and any associated overlays may be loaded.

For system configuration files (i.e., those generally provided by a software vendor), a search facility may process configuration files including toolbar files for an application in a predetermined order, at 804. Processing may comprise reading configuration files of various types and creating data structures and loading data into memory as required to initialize a software environment and a number of applications properly, at 806.

The search facility may process modifications made to application configurations after it processes the system configuration files. The search facility may process overlay files 600 in a specified order, at 808. For example, the search facility may process overlay files 600 from a software vendor first, as these may contain critical bugfixes. The search facility may next process overlay files 600 from the next layer in a multi-layer software management structure, such as a particular design firm's CAD group. Users may see a list of directories that contain their overlay files 600, and may specify which files are to be processed in a particular order. Required applications may then execute, at 810.

Various user actions may trigger a re-initialization of the software environment or selected applications, at 812. Invocation of the interface manager 400 for example may trigger the processing of all overlay files 600. In that case, the search facility may iterate through a list of registered applications and look for toolbar files, rather than looking for all toolbar files in particular directories. Thus reprocessing of configuration data may be selectively executed according to a predetermined set of triggers, at 814. The method may end when a user exits the software environment.

Although FIG. 8 describes the configuration-related loading process in general terms, the process may vary depending on particular implementations and software environments, as may be known in the art. In one embodiment for example, the loading process for a given application "App1" may be as follows:

With a search facility, find the first toolbar file for App1 under a corresponding directory path.

If the file exists, read it and populate the data structures. If the toolbar file inherits from another application, read in that other application's toolbars and instantiate a reference to those toolbars corresponding to the position of the "inherit" directive in the toolbar file; this enables other toolbars to be instantiated midway through another application's toolbar file.

Find all App1 overlay files, using the same path and mechanism described above.

Construct the final toolbar set based on the original data in the toolbar file, and the merged overlay files (in the original timestamp based order in which those items were changed).

This multi-layer incremental configuration process may be of particular utility. CAD groups may for example place overlay files into a path that is searched by the search facility. The timestamp stored for a particular modification allows subsequent changes to a higher-level overlay file (e.g., the CAD group's overlay file) to be incrementally inserted with minimal disruption to user overlays. Since the changes in the overlay file are processed in chronological order, the operations will be performed in the correct sequence. Moreover, if the user makes a subsequent modification to the same toolbar, its timestamp should ensure correct processing and execution.

To summarize, in the interface manager 400 GUI of the embodiments, via the related overlay files 600, users will be able to:

Create new toolbars (user toolbars).

Create new toolbar items. New items may be added to either user or system toolbars.

In addition to "action" items, which are the typical toolbar items which invoke an action when pressed, the user will be able to select from the small selection of non-action items already supported by software environment toolbars, including comboboxes, type-in fields and toolbar separators.

Delete or hide toolbar items, with the restrictions outlined above.

Move items within a toolbar (i.e., change the order, but not the items themselves), and move items to another toolbar. The latter operation will depend upon whether the item is a user item or a system action. For a user action, the declaration of the item being moved will simply move from one overlay file 600 to another. For a system action, the "from" action will be hidden, and referenced in an overlay file 600 for the "to" toolbar. (There may be some restrictions with system actions in one embodiment, however, in that the "from" and "to"

items must exist within the same application.) Although the interface control files 500 will be read at startup by the software environment, these are only the templates that are used to create toolbars; the toolbars and corresponding actions are not actually created until an application is installed.

Customize which toolbars are visible in which workspaces in a semi-automatic manner. Presently, in one vendor's tool suite, to add a toolbar to a workspace the user has to change into that workspace, show the toolbar, position the toolbar, then save the workspace. The interface manager 400 GUI may provide a mechanism for users to choose in advance which workspaces to customize when the interface manager 400 is closed. Each workspace is applied in turn, and the user is prompted with a dialog to adjust the workspace to their liking, and click "OK" to save the workspace and apply the next workspace in the sequence. In one embodiment, the semi-automatic workspace configuration feature may only work in windows where the user has that specific application window open. For example, one would need to have a Layout window open to adjust Layout workspaces.

The embodiments of the present invention therefore allow application users to intuitively change the contents and organization of toolbars and other application interface elements.

Figure 9:
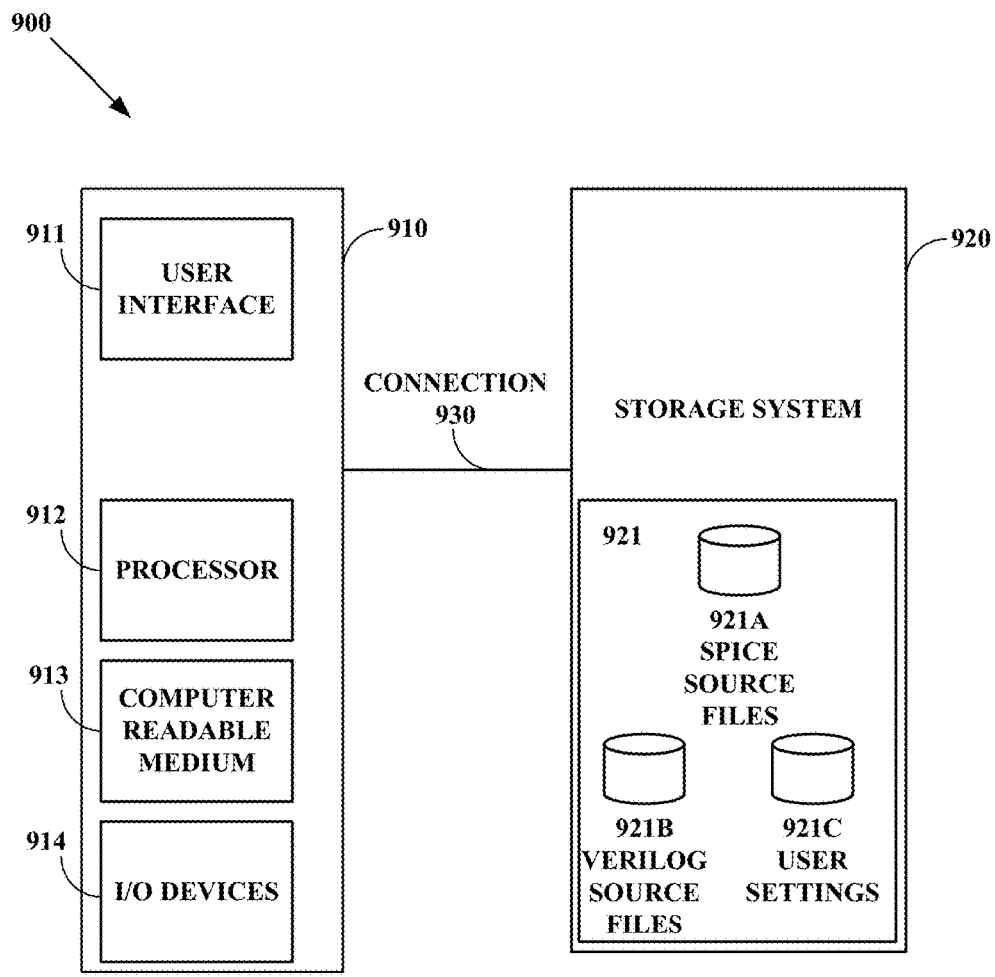
FIG. 9 is a block diagram of an electronic design automation system, according to an embodiment.

FIG. 9 shows a block diagram of an exemplary toolbar configuration system 900 according to an embodiment. This system may provide graphical user interface functionality for any of the methods described above. A user may access the system 900 through a standalone client system, client-server environment, or a network environment. System 900 may comprise one or more clients or servers 910, one or more storage systems 920, and a connection or connections 930 between and among these elements.

Client 910 may execute instructions stored on transitory or non-transitory computer readable medium 913 with processor 912, and may provide a user interface 911 to allow a user to access storage system 920. The instructions may be part of a software program or executable file that may operate electronic design automation (EDA) software. Client 910 may be any computing system, such as a personal computer, workstation, mobile computer, or other device employing a processor which is able to execute programming instructions. User interface 911 may be a GUI run in a user-controlled application window on a display. A user may interact with user interface 911 through one or more input/output (I/O) devices 914 such as a keyboard, a mouse, or a touch screen.

Storage system 920 may take any number of forms, including but not limited to a server with one or more storage devices attached to it, a storage area network, or one or a plurality of non-transitory computer readable media. Databases 921 may be stored in storage system 920 such that they may be persistent, retrieved, or edited by the user. Databases 921 may include SPICE source files 921A, Verilog source files 921B, and a user input database 921C for example. These databases may be kept as separate files or systems, or may be merged together in any appropriate combination.

Only one client 910 is shown connected to storage system 920 through connection 930, which may be a simple direct wired or wireless connection, a system bus, a network connection, or the like, to provide client 910 with access to storage system 920. In another aspect, connection 930 may enable multiple clients 910 to connect to storage system 920. The connection may be part of a local area network, a wide area network, or another type of network, again providing one or more clients with access to storage system 920. Depending on system administrator settings, client 910's access to system storage 920 or to other clients may be limited.

Figure 10:
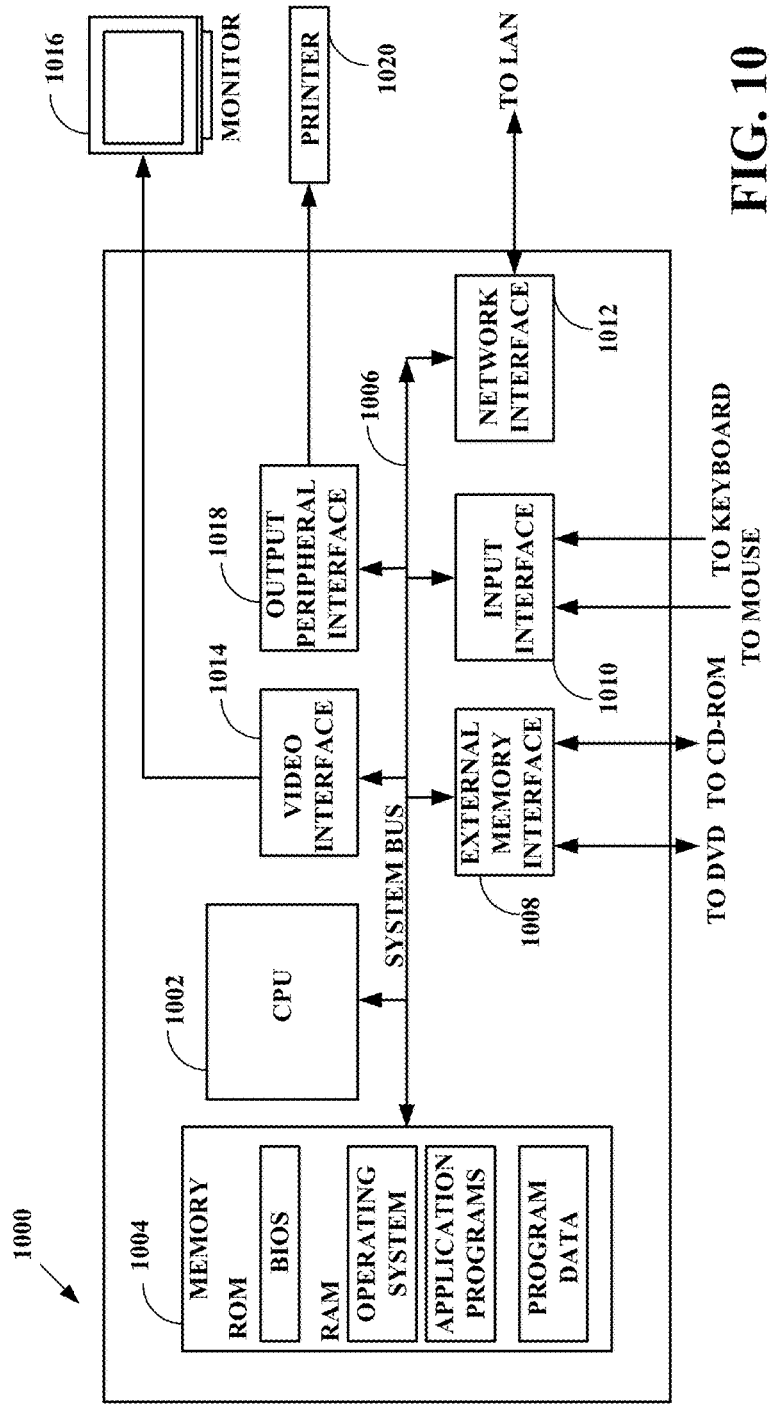
FIG. 10 is a diagram of a computer system, according to an embodiment.

FIG. 10 depicts a computer system comprising the structure for implementation of the embodiments described above. Computer system 1000 comprises a central processing unit (CPU) 1002 that processes data stored in memory 1004 exchanged via system bus 1006. Memory 1004 typically includes read-only memory, such as a built-in operating system, and random-access memory, which may include an operating system, application programs, and program data. Computer system 1000 also comprises an external memory interface 1008 to exchange data with a DVD or CD-ROM for example. Further, input interface 1010 may serve to receive input from user input devices including but not limited to a keyboard and a mouse. Network interface 1012 may allow external data exchange with a local area network (LAN) or other network, including the internet. Computer system 1000 also typically comprises a video interface 1014 for displaying information to a user via a monitor 1016. An output peripheral interface 1018 may output computational results and other information to output devices including but not limited to a printer 1020.

Computer system 1000 may comprise for example a personal computer or an engineering workstation, each of which is widely known in the art and is commonly used for integrated circuit design tasks, along with software products commercially available for performing computer-aided integrated circuit design tasks. Computer system 1000 may also comprise a mobile computer, including for example a tablet computer or a smart phone. The computer system of FIG. 10 may for example receive program instructions, whether from existing software products or from embodiments of the present invention, via a computer program product and/or a network link to an external site.

Figure 11:
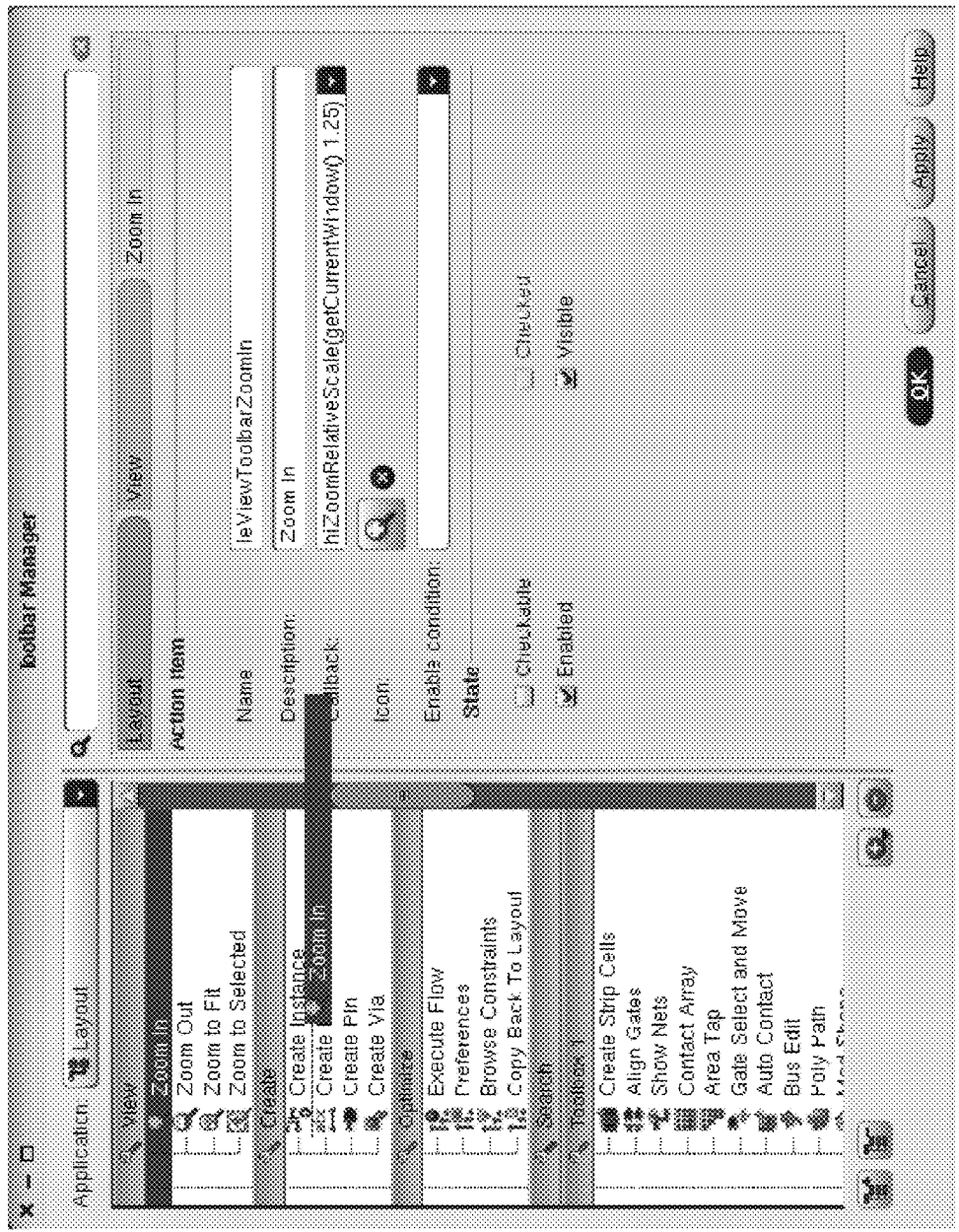
Figure 12:
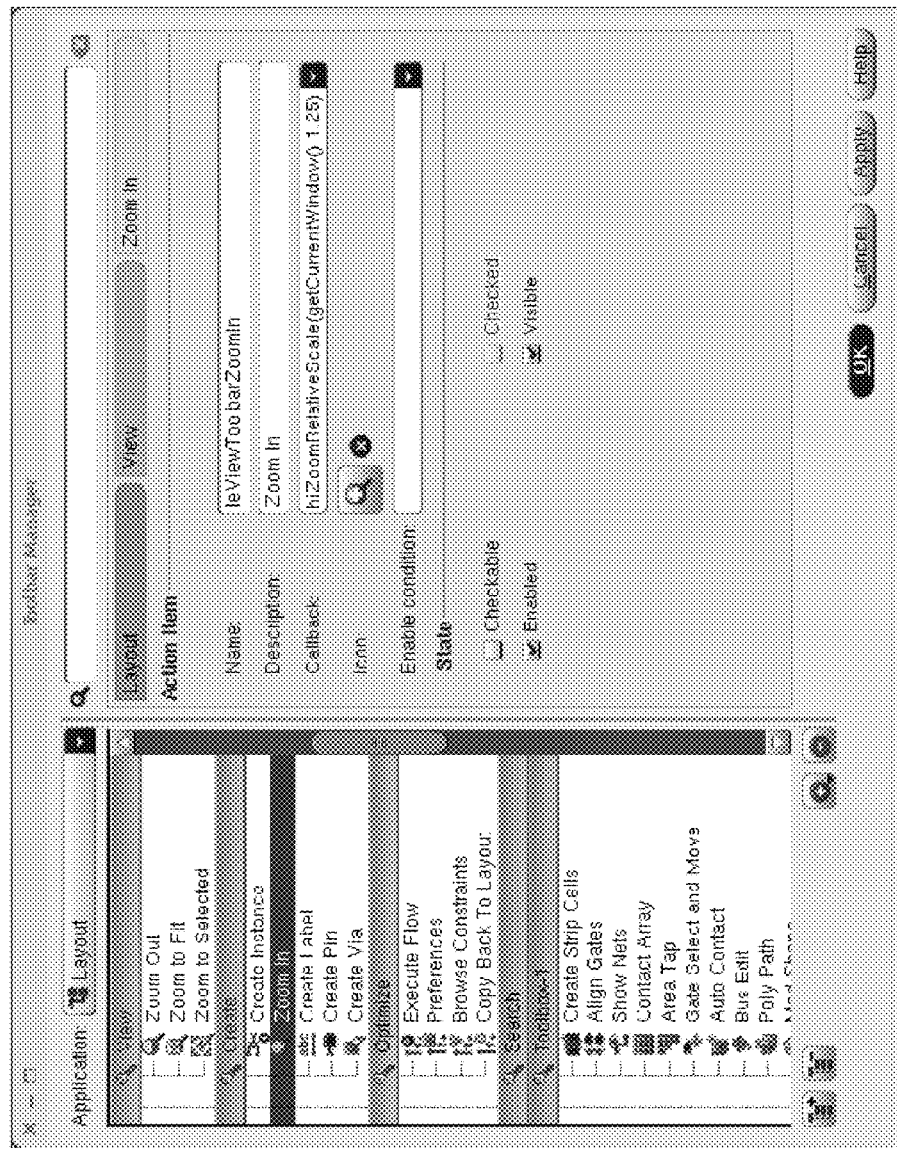

FIGS. 11-32 show details of various scenarios in which various embodiments may perform the operations described above. FIG. 11 shows the interface manager 400 of FIG. 4 immediately after the shortcut menu on "Zoom In" was used to bring up the GUI. An existing toolbar item may now be moved to another toolbar. In this case, the "Zoom In" item may be dragged from the "View" toolbar to the "Create" toolbar. FIG. 12 shows the interface manager of FIG. 4 immediately after dropping the "Zoom In" item onto the "Create" toolbar.

Figure 13:
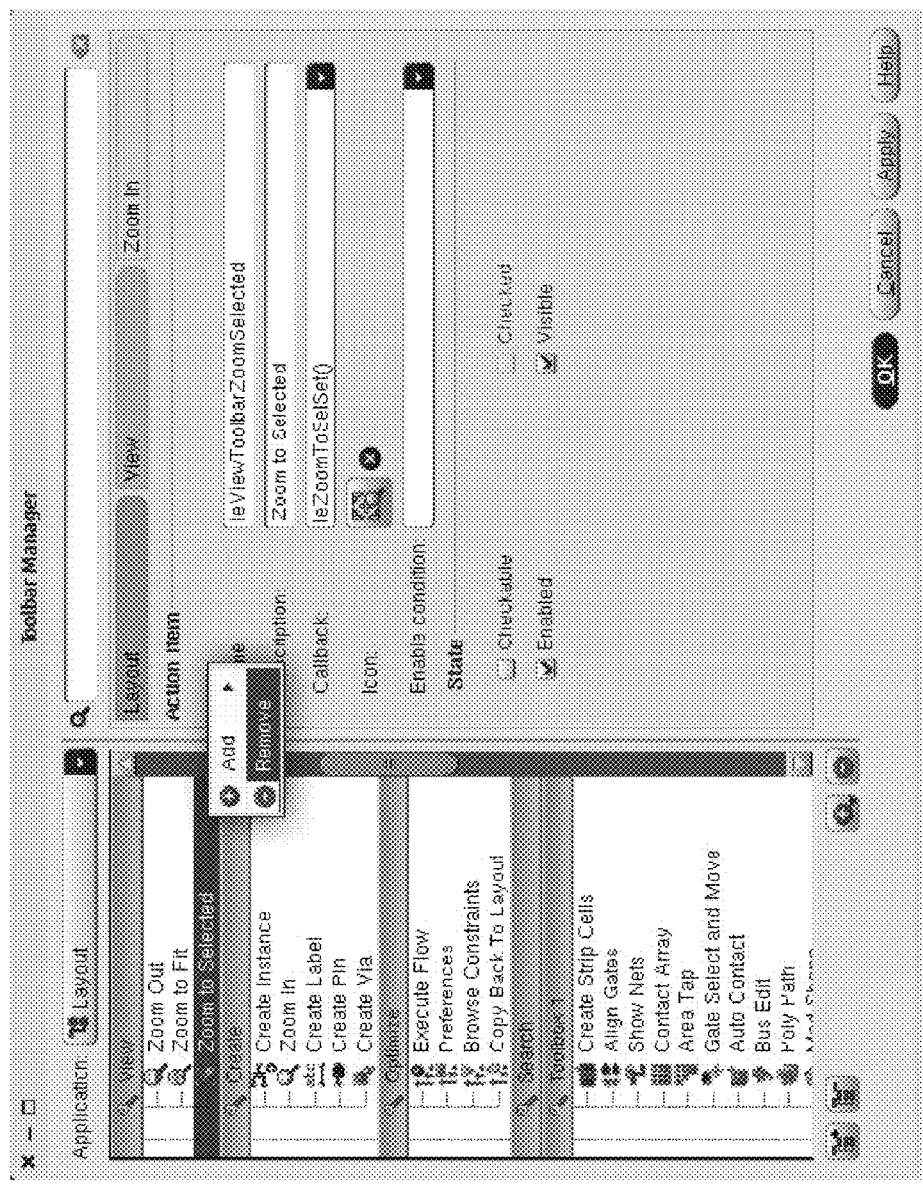
Figure 14:
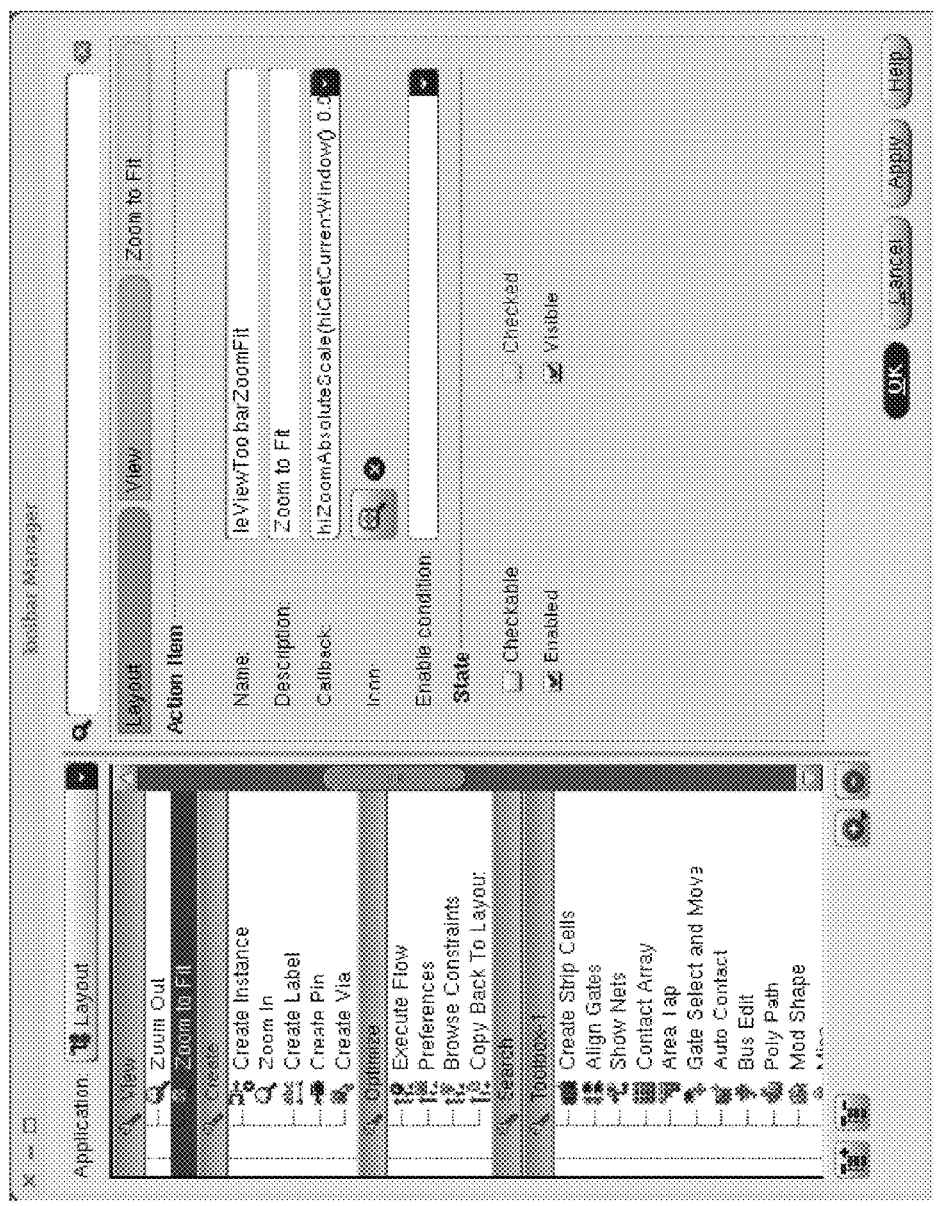

FIG. 13 shows the removal of a system action (the "Zoom to Selected" item) from a system toolbar. In this case the removal may be initiated via the remote context menu item, which may be activated for example by right clicking a cursor device when the cursor is over the toolbar item to be chosen. Use of the remote context menu item as shown is functionally the same as using the "−" button shown below the tree. FIG. 14 shows the state of the interface manager 400 after removing the "Zoom to Selected" item. In this embodiment, system tools may be removed even from the interface manager 400 GUI, but may still be restored via a reset button, to be described below.

Figure 15:
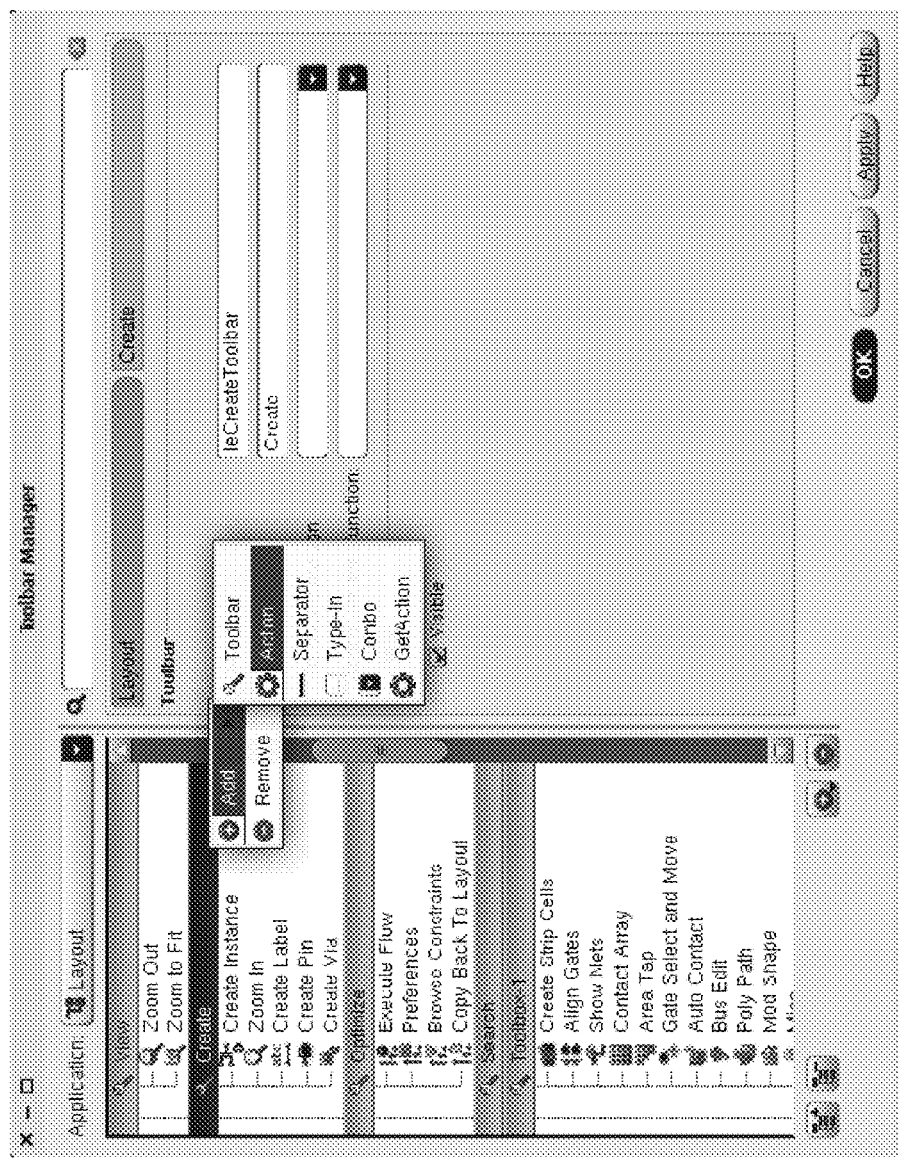
Figure 16:
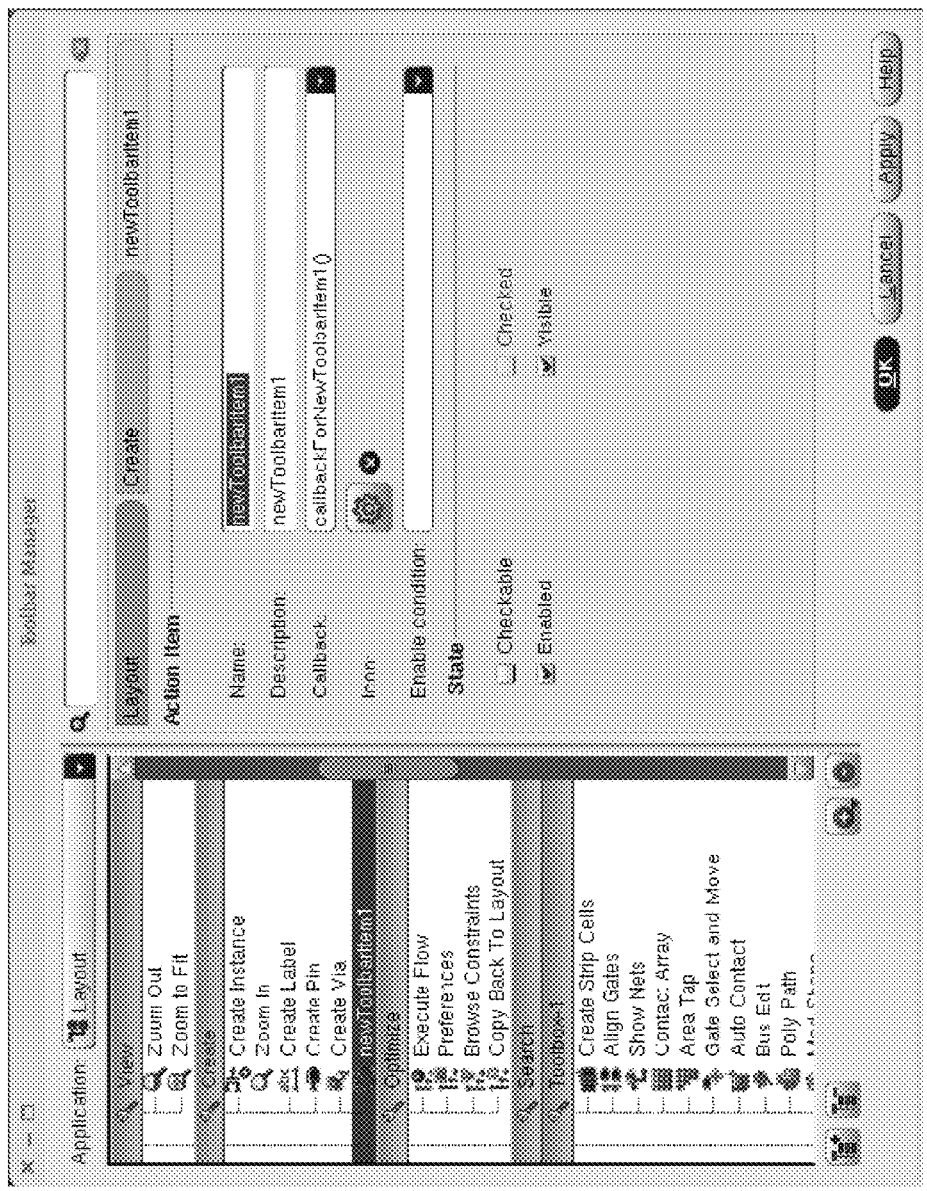
Figure 17:
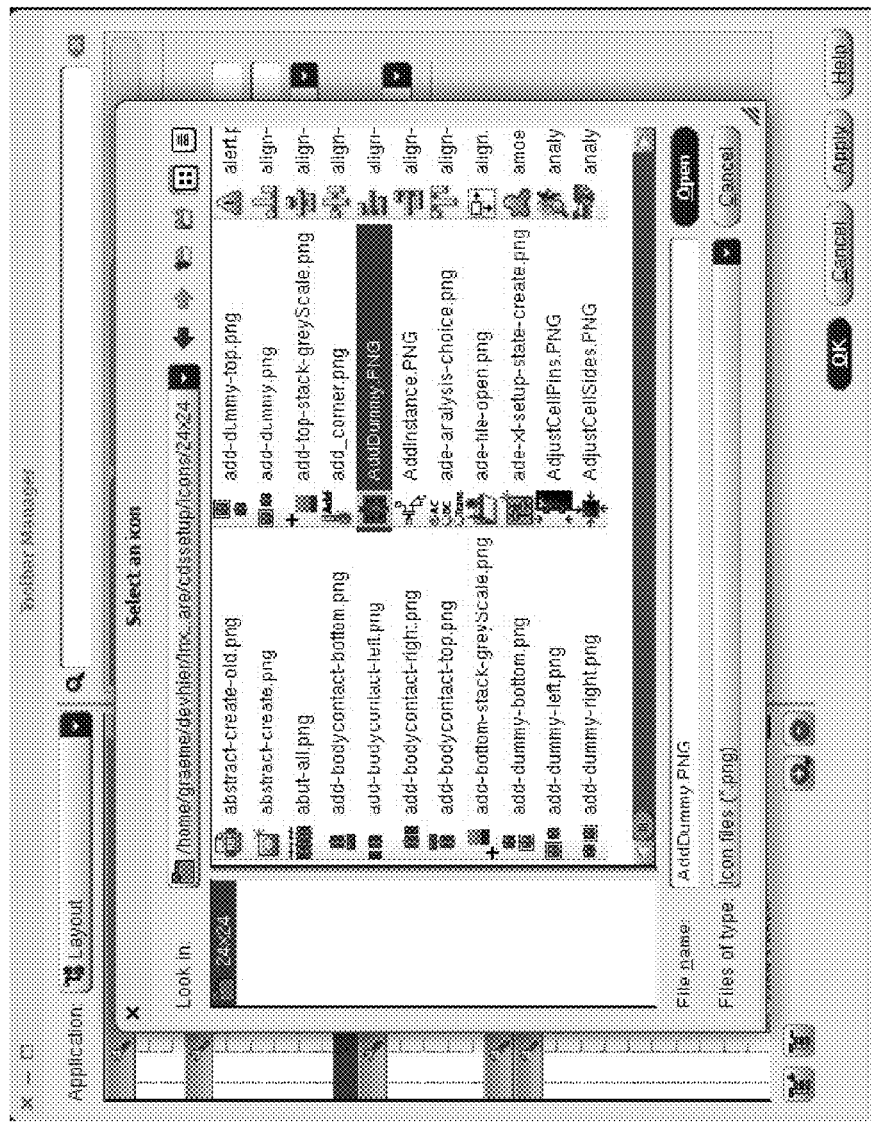
Figure 18:
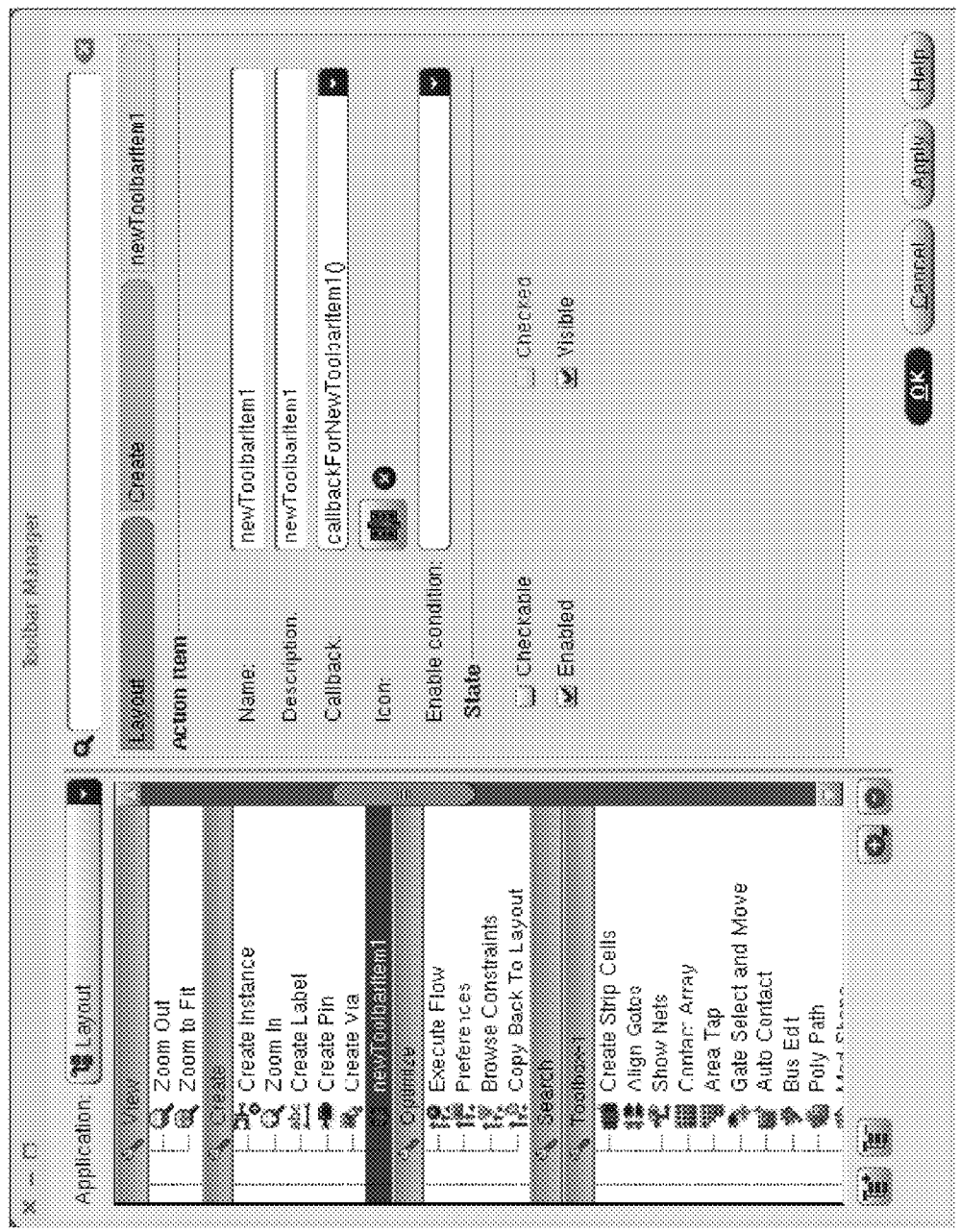
Figure 19:
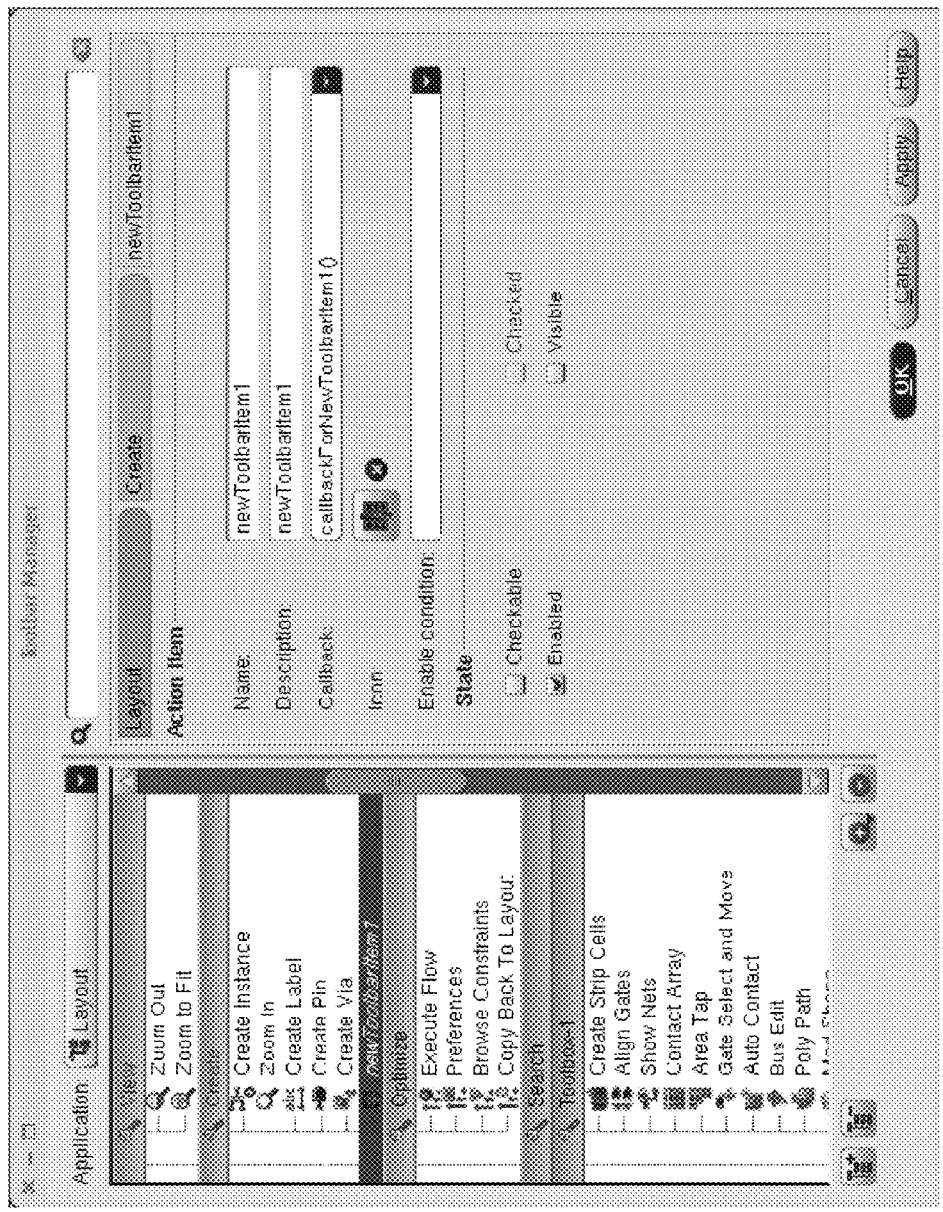
Figure 20:
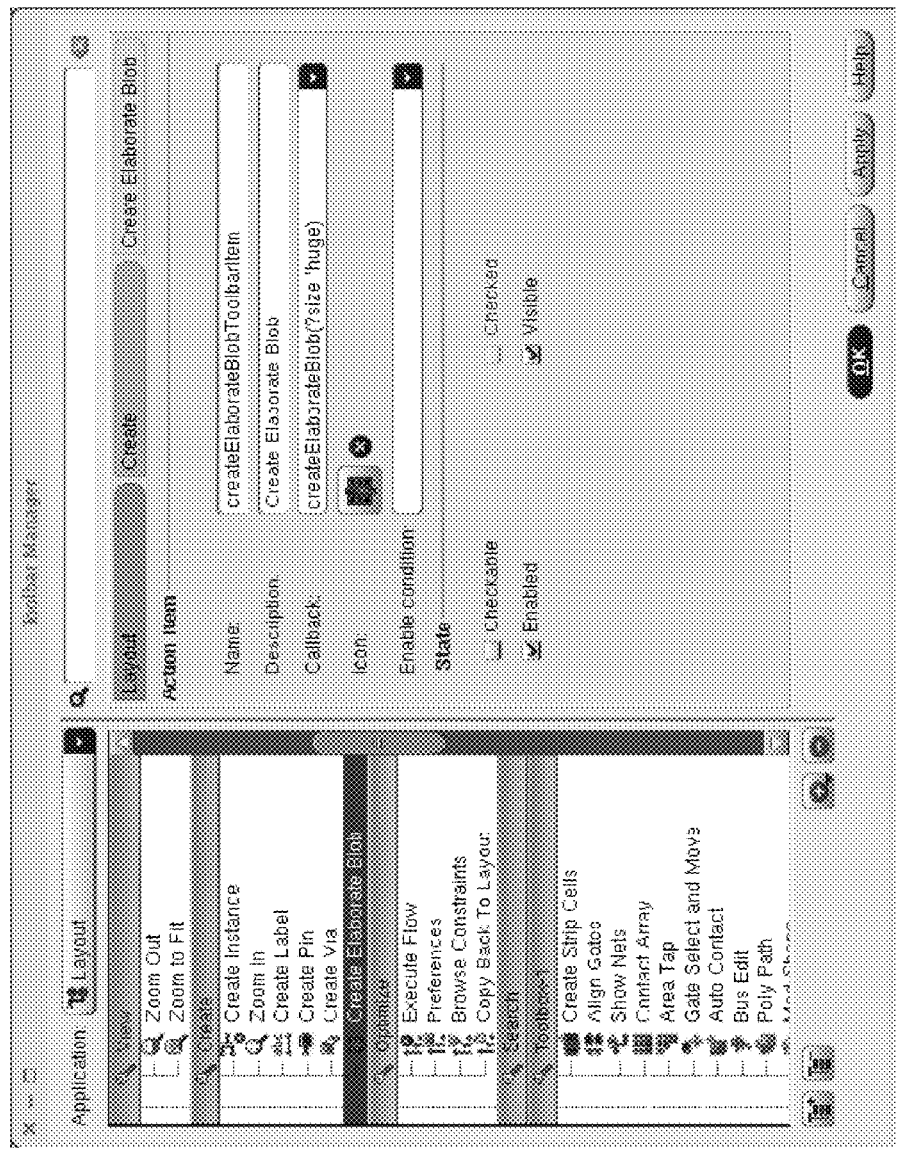
Figure 21:
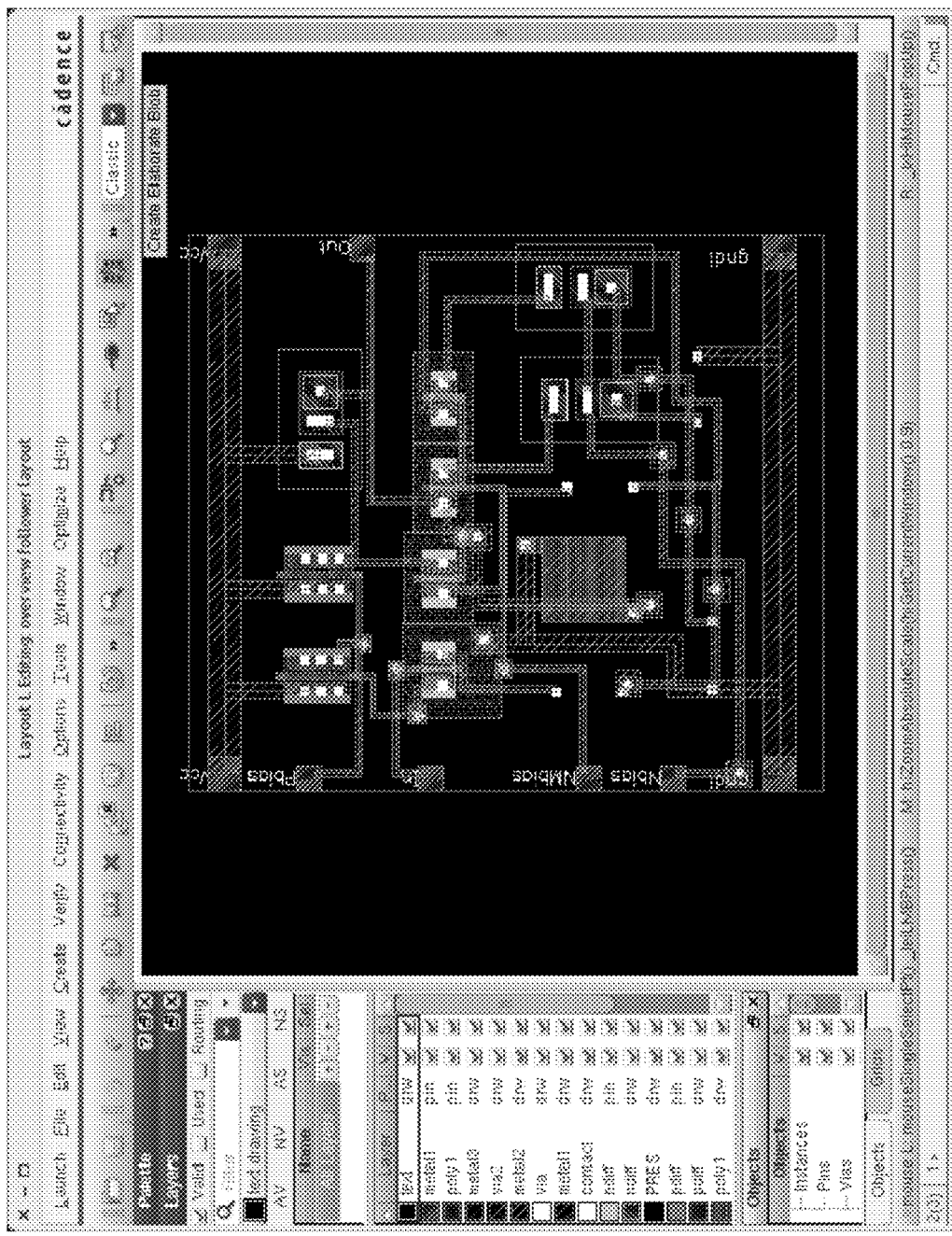

FIG. 15 shows the creation of a new interface item. In this case, a user may invoke the context menu by right clicking a cursor device on the Create toolbar and then choosing to create a new action. This use of the context menu as shown is functionally the same as using the "+" button shown below the tree. FIG. 16 shows the interface manager 400 GUI after adding the new item "newToolbarItem1" to the Create toolbar. FIG. 17 shows one approach to selecting an icon for the new item. Clicking on the button to the right of "Icon:" displays a file browser that allows the user to choose an existing icon file. If the selected icon filename is found by the search facility, then that filename may simply be saved (e.g., AddDummy.png as shown). If the user chooses an icon filename that is either outside of the search facility, or is within the search facility but a different icon with the same filename exists at a higher precedence level, the full path is saved. FIG. 18 shows the new icon in the icon selector button and in the tree. FIG. 19 shows that a user may toggle the "Visible" checkbutton off to specify that the item will not be shown by default in the application GUI. The item's representation in the interface manager tree uses italicized text to denote this attribute status in this example. Other means of denoting a hidden status may also be used. FIG. 20 shows the remaining data fields may be customized by the user to provide the desired callback, description (e.g. "Create Elaborate Blob"), and symbol name for the new interface item. FIG. 21 shows the application GUI with the new item in the toolbar as specified by the user. In this example, one Zoom toolbar item was removed, one item was moved to the Create toolbar, and one custom item was added. An item description may pop up to express a toolbar item's meaning when a cursor hovers over a toolbar item, as shown.

FIG. 22 shows an overlay file corresponding to the saved changes in "Layout.overlay" after the changes made in FIGS. 11 through 21. In this embodiment, the syntax is basically the same as a toolbar file, with two distinctions:

1. The "meta" property for a particular item is new, and stores meta-information about an item. In one embodiment, that may include whether a child of that item was moved, hidden or shown, where "shown" means that it was actually hidden at a higher level (e.g., perhaps by a CAD group), but the user can override this to re-show it again.

2. Definitions need not be complete, if they are merely referencing another item defined elsewhere. In a toolbar file, the item usually must be complete and self-contained. An overlay file need only store the item's name (which is used to find the original item definition), along with the data which the user has explicitly overridden.

The "meta" property for a toolbar may store information about toolbar items, such as which are shown or hidden, and which positions they occupy. The "hidden" list is a list of items that are defined on the particular toolbar in a toolbar file, but which are hidden because the user either removed them, or moved them to another toolbar. The item name may be stored along with the timestamp of when the customization operation occurred. The software environment may reconstruct the final toolbar system by layering these customization operations, sorted by timestamp, so they are applied in the original order. In this case, two items were hidden, with one being removed and the other moved to the Create toolbar.

The "moved" property may be used to store the item ordering. The index on the toolbar may store the index to which the item was moved, and the timestamp may store the time when that operation was performed. Moving one item affects the position of other items in the same toolbar, which potentially means the "index" value for other items is no longer correct if timestamp order is not respected. For example, if a toolbar item is moved to position 0 (to be the first item depicted in a toolbar), and then another item is moved to position 3 (to be the fourth item depicted), applying the following operations in the wrong order would result in incorrect behavior:

1—Move item1 to position 3 (fourth index)
2—Move item2 to position 0 (first index)
3—By moving item2 to position 0, it may have moved item1 up to position 4 (fifth index)—but only if item2 was originally positioned after item1.

Note that this overlay file entry refers to the existing system action:
(nil name leViewToolbarZoomIn index 1 time (1368051787 622014))
and this overlay file entry references the new toolbar item, defined below:
(nil name createElaborateBlobToolbarItem index 5 time (1368052078 279680))

Note that the item need not appear in "meta" to exist on a toolbar, such entries merely store the position information.

Figure 23:
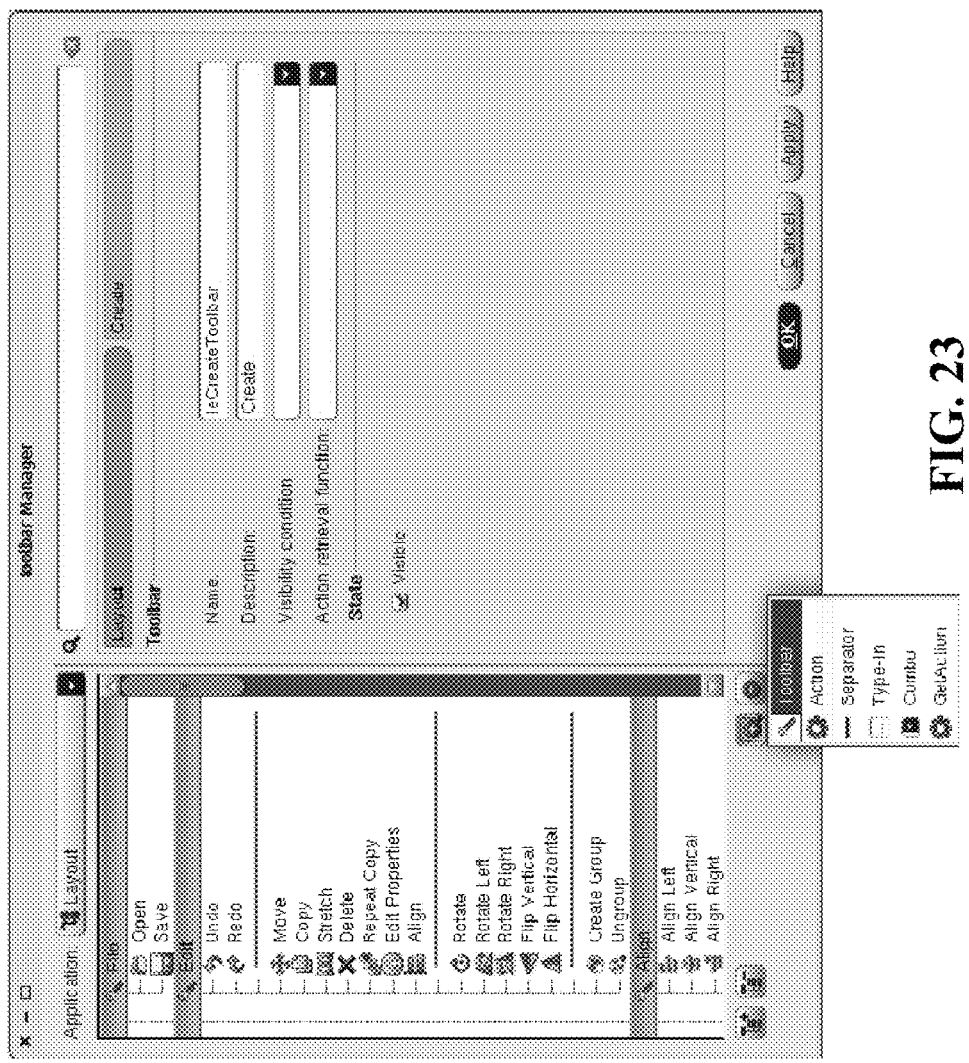
Figure 24:
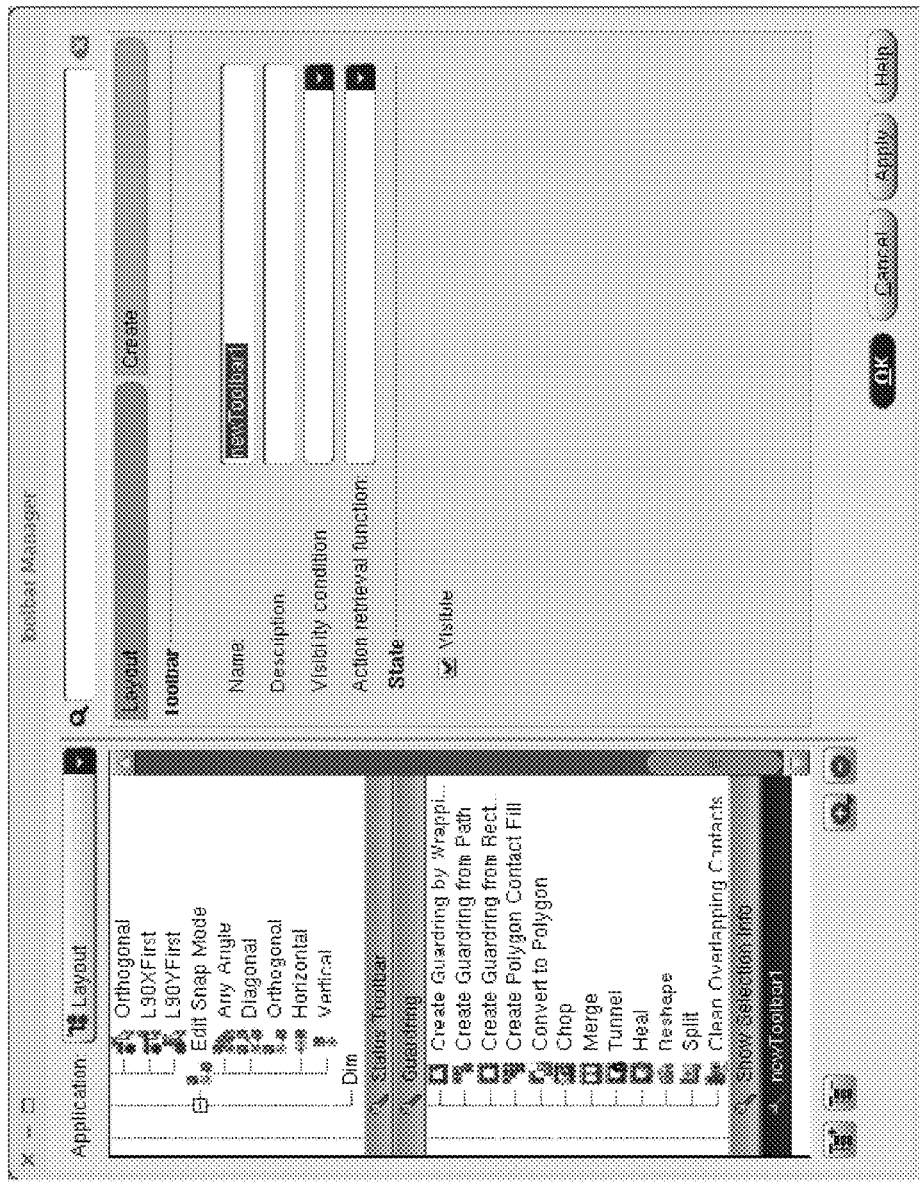
Figure 25:
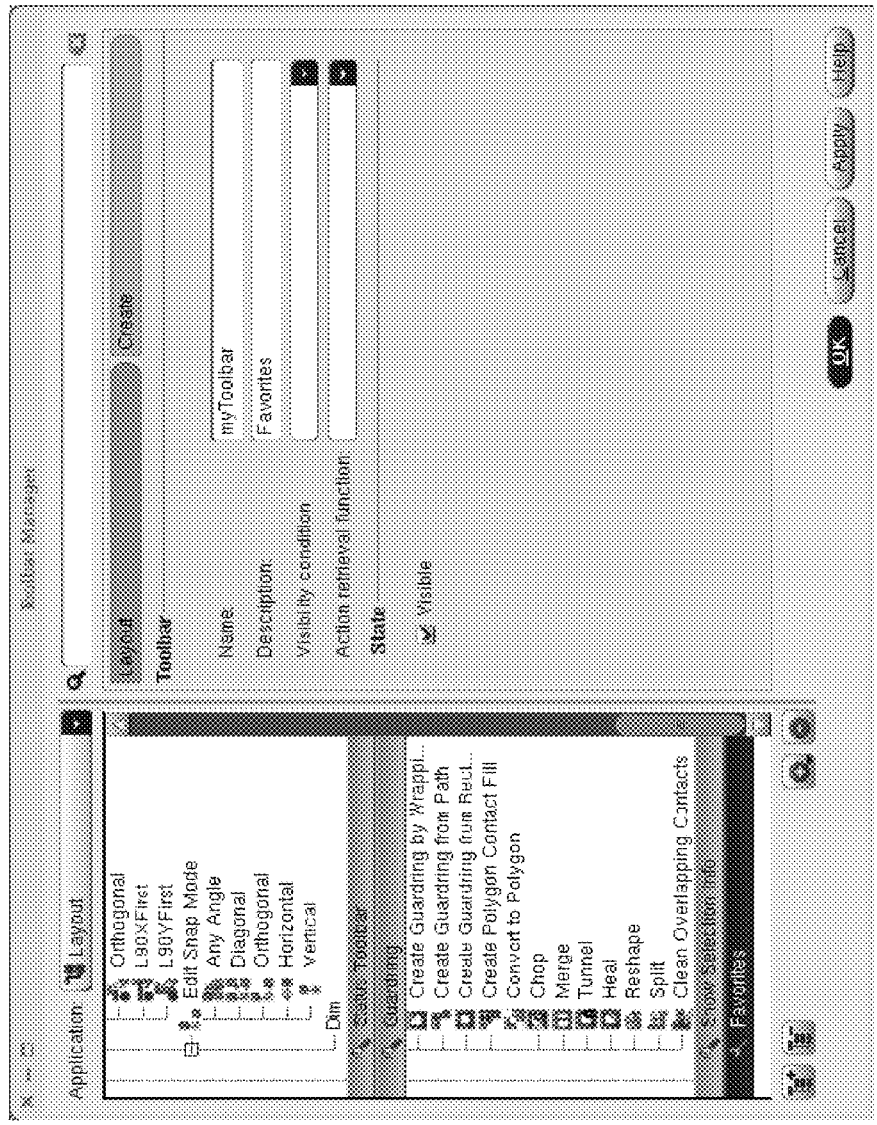

FIG. 23 shows the addition of a new toolbar to an application using the toolbutton menu below the tree. In this case, the application is shown as Layout, with the corresponding toolbars and toolbar items shown in the tree. FIG. 24 shows the new toolbar is selected in the tree (newToolbar1) and is ready for customization by the user. FIG. 25 shows the name "myToolbar" and description "Favorites" have been entered by the user.

Figure 26:
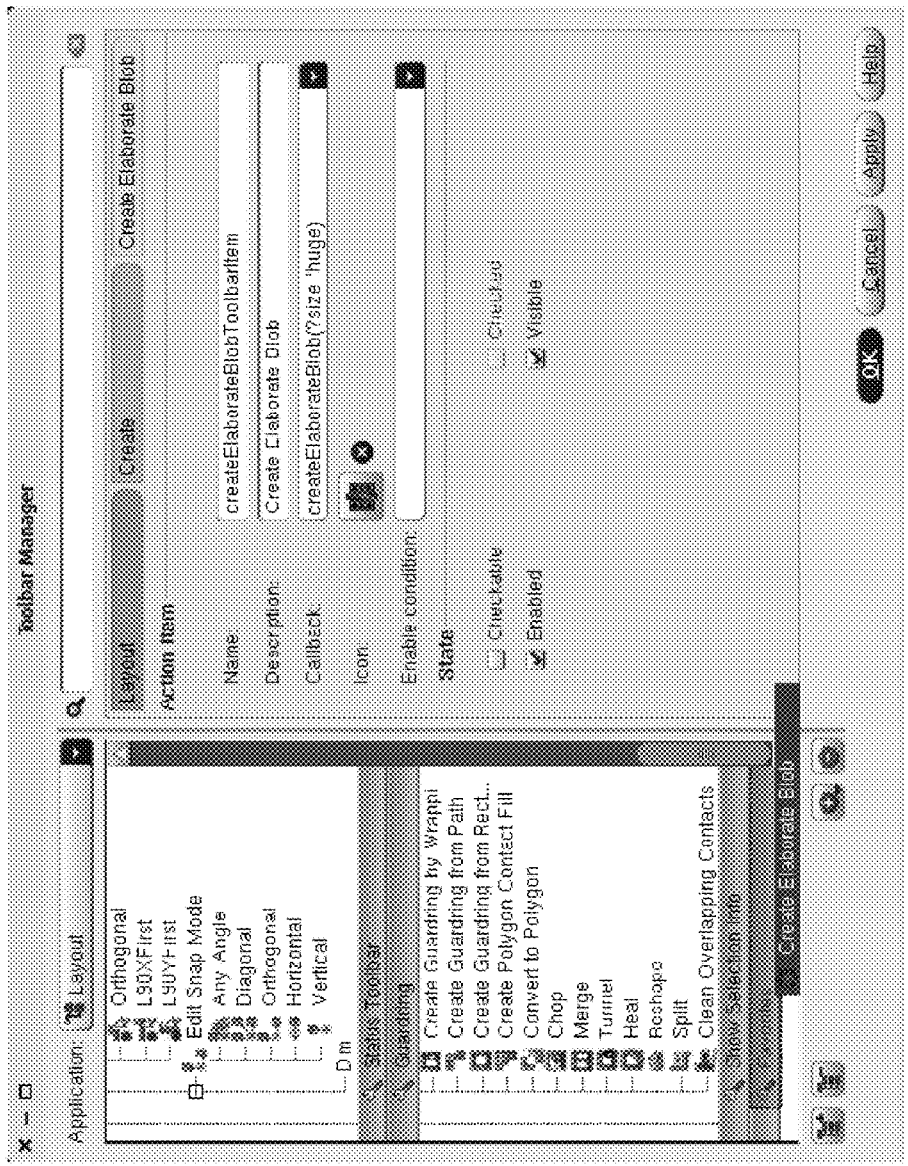
Figure 27:
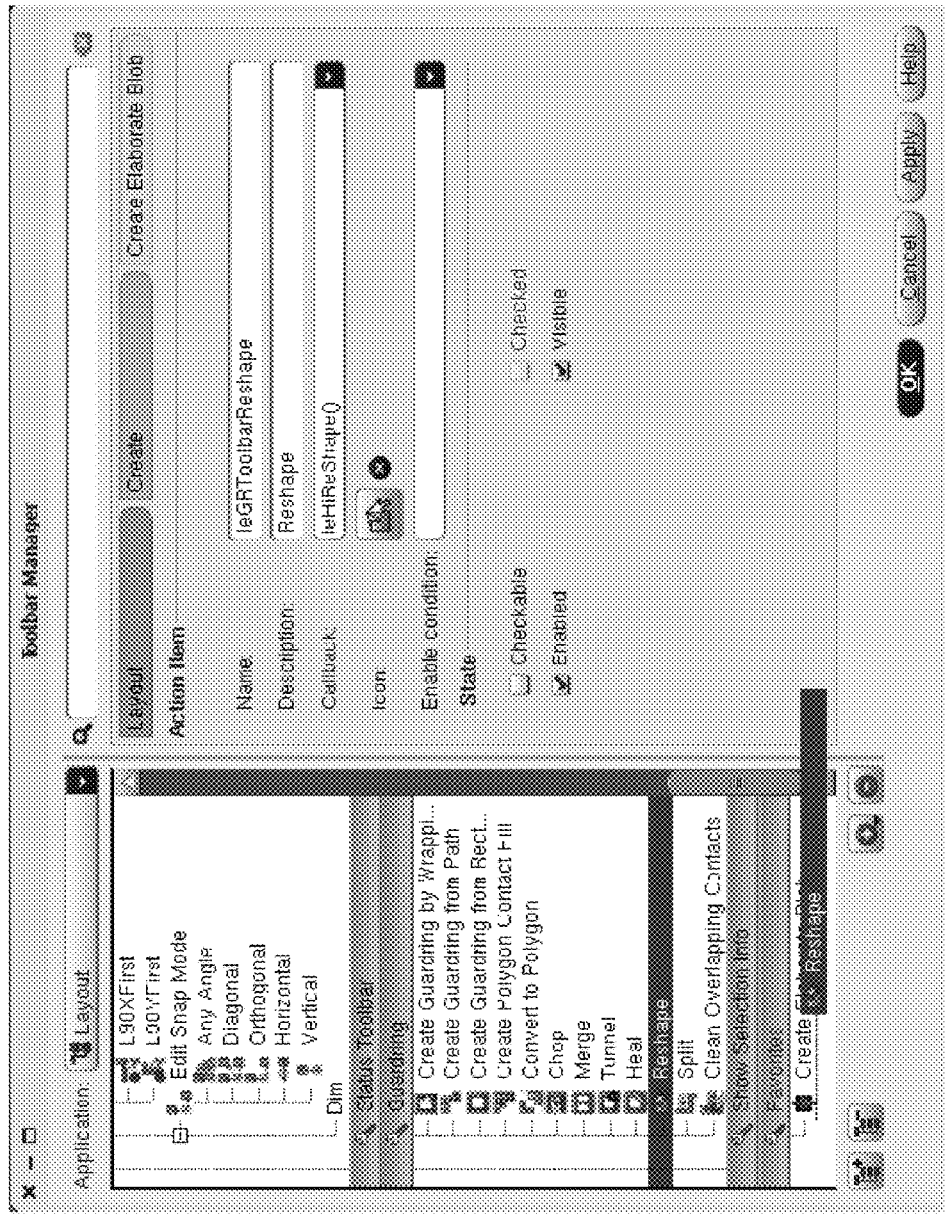
Figure 28:
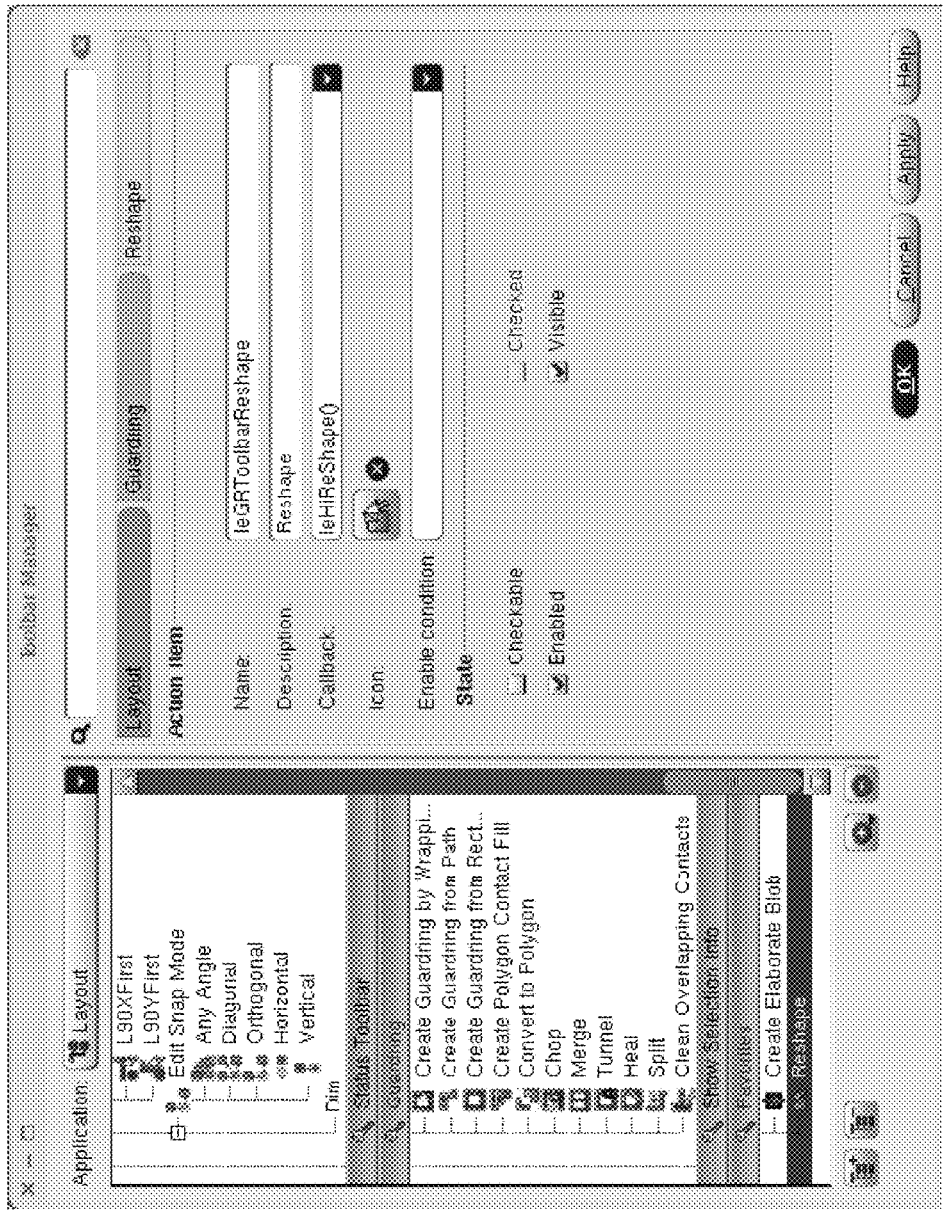
Figure 29:
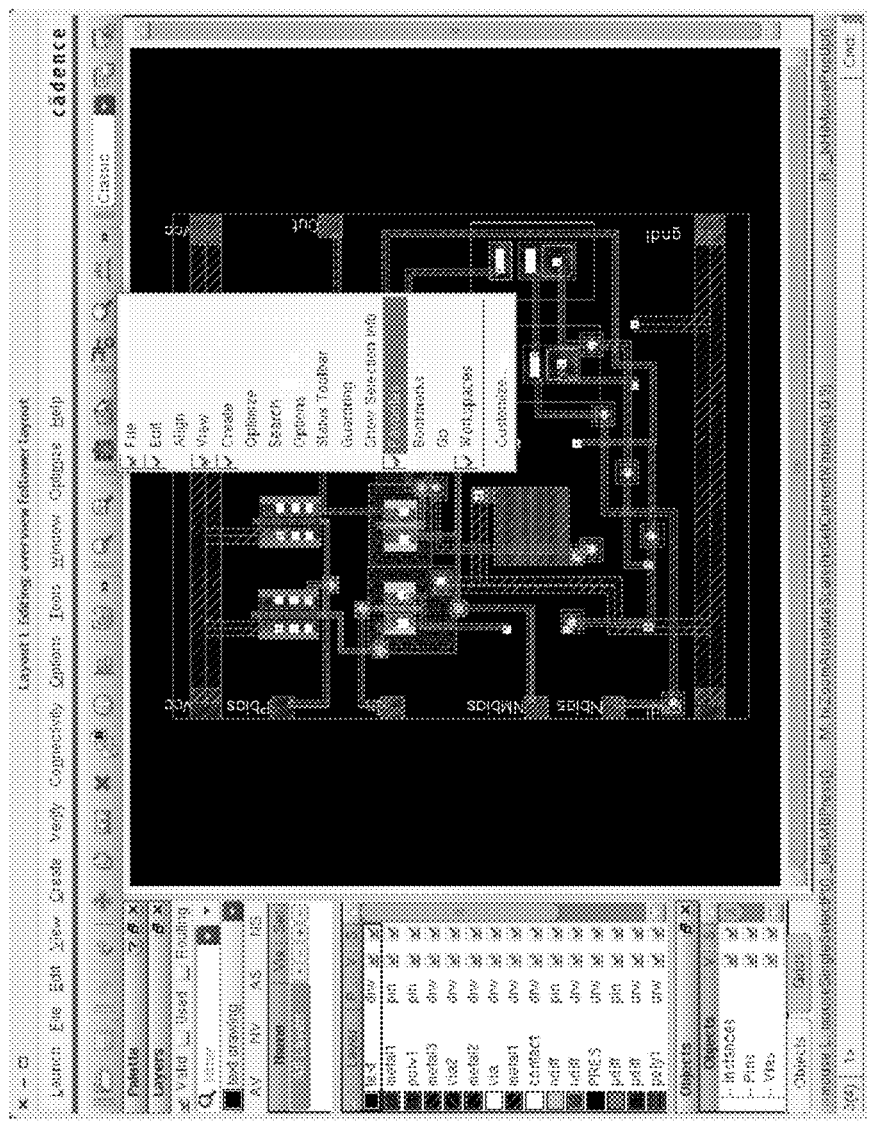

FIG. 26 shows a previously created item being moved to a new toolbar. In this case, the "Create Elaborate Blob" item created on the Create toolbar is being dragged to the new "Favorites" toolbar. FIG. 27 shows an existing system item "Reshape" from the Guardring system toolbar being dragged to the new "Favorites" toolbar. FIG. 28 shows the new "Favorites" toolbar with both newly moved items in place. FIG. 29 shows the application GUI with the new user-defined "Favorites" toolbar and the toolbar shortcut menu. The shortcut menu lists the available toolbars, and allows them to be shown or hidden via checkbuttons.

FIGS. 30A and 30B (FIG. 30A is continued on FIG. 30B) show an overlay file corresponding to the saved changes in "Layout.overlay" after the changes carried out in FIGS. 23 through 28. In this file, the first "meta" entry is the application-level meta property, which stores meta information about toolbars. In contrast, the meta property at the toolbar level stores information about the toolbar items on that toolbar. This information is external to the item itself, i.e., moving an item isn't really a change to the item, it's a change to whatever houses that item. If the information were stored as part of that item, it would affect all instances of that item, rather than just the one on that toolbar. Since an item may be referenced on multiple toolbars, information like the item's position on the toolbar is therefore stored in the toolbar's meta property.

This overlay file entry describes the new toolbar that was added:
(nil name myToolbar index 13 time (1368053035 246101))

Note for the Create toolbar, there is still meta information about something which was created on this toolbar, but moved elsewhere. Removal of the definition of this item could affect the interpretation of the "index" value for any items modified before the item was removed. The retained meta information makes the ordering code aware of the fact that there was something at index 5 (position 6) at a particular time, which was removed at a later time (hidden section), and any index values which fall between those two times are based on the toolbar having an item at index 5.

This overlay file entry describes the toolbar that was hidden at this time:
(nil name createElaborateBlobToolbarItem time (1368053326 310027))

This overlay file entry describes the item that changed position at this time:

(nil name createElaborateBlobToolbarItem index 5 time (1368052078 279680))

This overlay file entry describes the system action that was moved at this time:
(nil name leGRToolbarReshape time (1368053414 660006))

This overlay file entry describes the new toolbar that was created:
name myToolbar These overlay file entries describe the items that were moved from other toolbars:
(nil name createElaborateBlobToolbarItem index 0 time (1368053326 309993))
(nil name leGRToolbarReshape index 1 time (1368053414 662568))

The items list for Create Elaborate Blob describes the definition of a custom action that was moved to the toolbar on which it is now instantiated. The original toolbar (Create) still retains placeholders, so the action could be left defined on the Create toolbar and simply referenced by name here. The custom action is moved here purely to make the overlay file correspond a more closely to what the user sees (e.g., they see the Create Elaborate Blob action on the Favorites toolbar in the application GUI, so that's probably where a user would look for it if they ever had to manually review the overlay file).

Figure 31:
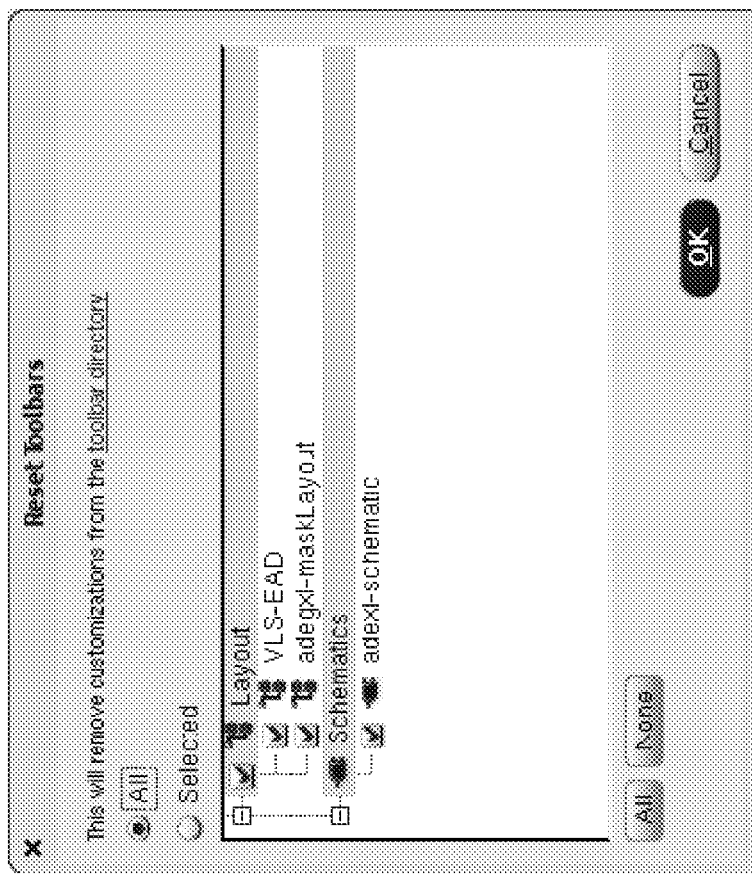
Figure 32:
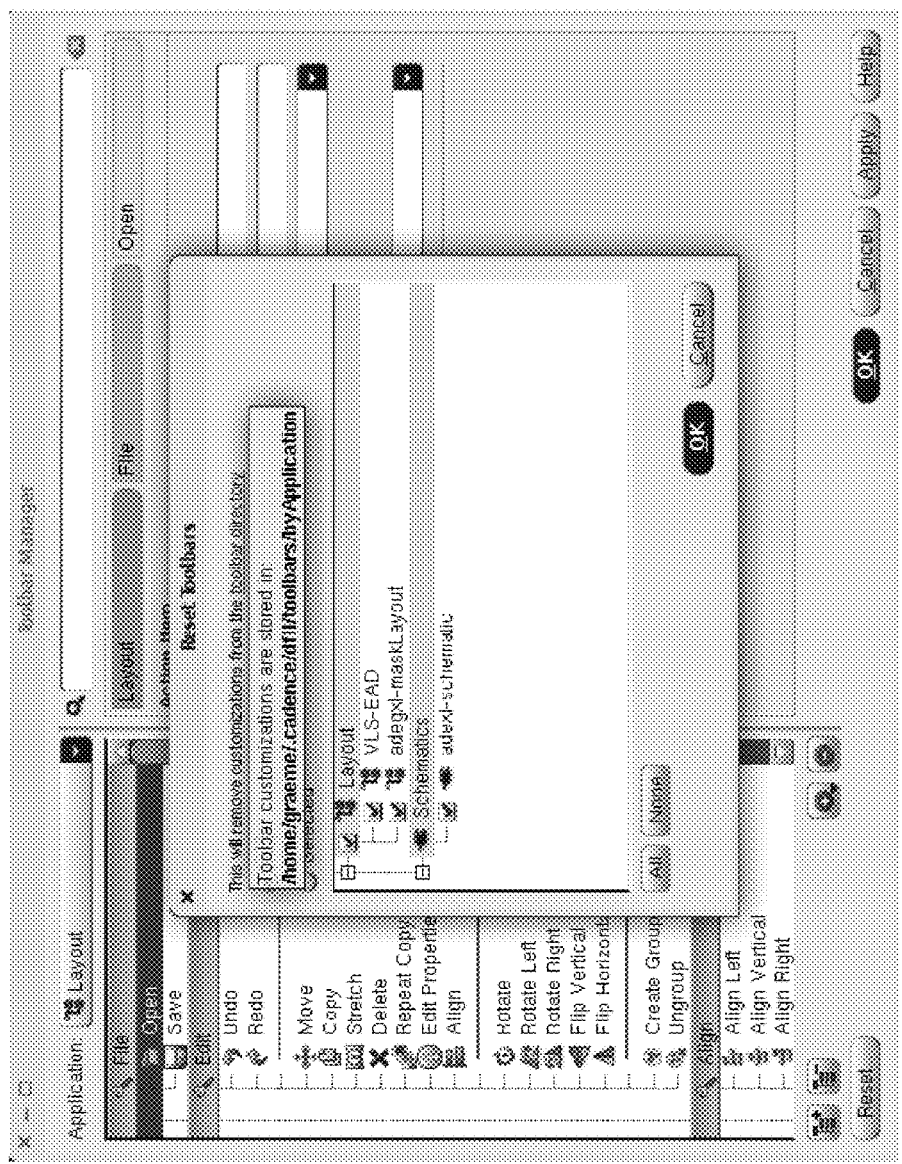

FIG. 31 shows a dialog box that appears when a user activates the reset button in the interface manager 400 GUI to remove user customizations. In this embodiment, only applications that actually have customizations are visible. Such applications may be discerned from the user's home toolbar directory. Either all of the customizations or selected ones of the customizations may be removed, according to an embodiment. FIG. 32 shows that hovering over the "toolbar directory" text triggers a display of the actual path that contains overlay files 600. These overlay files 600 will be modified if the user chooses to remove any customizations.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A computer-implemented method for configuring elements in a graphical user interface (GUI), comprising:
presenting an interface manager GUI to an application user, wherein the interface manager GUI provides a platform to configure the elements of the GUI, and wherein the elements of the GUI have default settings specified by at least one interface control file;
receiving user input, via the interface manager GUI, that specifies at least one desired interface configuration change to the default settings for a desired release of at least one application; and
creating at least one overlay file that, when processed by a computer, implements the desired interface configuration change, while retaining backward compatibility with each application when the interface configuration change implemented by a particular one of the at least one overlay file is selectively reset such that the default settings are restored, wherein changes in the at least one overlay file are processed in chronological order,
wherein the at least one overlay file includes a different filename suffix than the at least one interface control file, wherein the different filename suffix prevents a different release of the at least one application from processing the at least one overlay file.

2. The method of claim 1 wherein the application is an electronic design automation (EDA) program.

3. The method of claim 1 wherein the overlay file is created by one of a software vendor, a user group, and an individual application user.

4. The method of claim 1 wherein the desired interface configuration change comprises at least one of: deleting an interface element, hiding an interface element, adding an interface element, modifying an interface element, deleting a toolbar, deleting a toolbar button, hiding a toolbar, hiding a toolbar button, reordering a toolbar button within a toolbar, moving a toolbar button to another toolbar, adding a toolbar, adding a toolbar button, changing a toolbar button icon, and changing a toolbar button callback.

5. The method of claim 1 wherein the overlay file avoids a collision with an existing interface control file by at least one of a separate storage location, a separate filename, and the different filename suffix.

6. The method of claim 1 wherein backward compatibility is retained by at least one of: processing existing interface control files prior to processing overlay files, processing overlay files according to a predetermined ordering algorithm, and limiting desired interface configuration changes involving deletions of an interface element.

7. The method of claim 6 wherein the predetermined ordering algorithm is specified by the application user according to a set of selections made by the application user from a list of directories containing the at least one created overlay file.

8. The method of claim 1 wherein the overlay file is one of a SKILL file and an Extensible Markup Language (XML) file.

9. The method of claim 1 wherein, when the desired interface configuration change requires modification directly to the at least one interface control file, the at least one overlay file appears to the application user, via the elements presented in the GUI, to implement the desired interface configuration change without actually modifying the at least one interface control file.

10. The method of claim 1 wherein at least two overlay files are created.

11. The method of claim 10 further comprising overlaying a first one of the at least two overlay files by a second one of the at least two overlay files creating multiple levels of customization, wherein the first one of the at least two overlay files is applied to the at least one interface control file, and wherein the second one of the at least two overlay files is applied to the first one of the at least two overlay files.

12. The method of claim 11 further comprising:
processing, by the computer, the at least two overlay files according to a predetermined ordering algorithm,
wherein the predetermined ordering algorithm refers to: i) first processing overlay files from a software vendor, ii) second processing overlay files from a management design group, and iii) third processing overlay files from the application user.

13. A non-transitory computer readable medium storing instructions that, when executed by a processor, perform a method for configuring elements in a graphical user interface (GUI), the method comprising:
presenting an interface manager GUI to an application user, wherein the interface manager GUI provides a platform to configure the elements of the GUI, and wherein the elements of the GUI have default settings specified by at least one interface control file;
receiving user input via the interface manager GUI that specifies at least one desired interface configuration change to the default settings for a desired release of at least one application; and
creating at least one overlay file that implements the desired interface configuration change, while retaining backward compatibility with each application when the interface configuration change implemented by a particular one of the at least one overlay file is selectively reset such that the default settings are restored, wherein changes in the at least one overlay file are processed in chronological order,
wherein the at least one overlay file includes a different filename suffix than the at least one interface control file, wherein the different filename suffix prevents a different release of the at least one application from processing the at least one overlay file.

14. The medium of claim 13 wherein the application is an electronic design automation (EDA) program.

15. The medium of claim 13 wherein the overlay file is created by one of a software vendor, a user group, and an individual application user.

16. The medium of claim 13 wherein the desired interface configuration change comprises at least one of: deleting an interface element, hiding an interface element, adding an interface element, modifying an interface element, deleting a toolbar, deleting a toolbar button, hiding a toolbar, hiding a toolbar button, reordering a toolbar button within a toolbar, moving a toolbar button to another toolbar, adding a toolbar, adding a toolbar button, changing a toolbar button icon, and changing a toolbar button callback.

17. The medium of claim 13 wherein the overlay file avoids a collision with an existing interface control file by at least one of a separate storage location, a separate filename, and the different filename suffix.

18. The medium of claim 13 wherein backward compatibility is retained by at least one of: processing existing interface control files prior to processing overlay files, processing overlay files according to a predetermined ordering algorithm, and limiting desired interface configuration changes involving deletions of an interface element.

19. The medium of claim 13 wherein the overlay file is one of a SKILL file and an Extensible Markup Language (XML) file.

20. A system comprising:
a memory storing executable instructions; and
a processor executing instructions to:
present an interface manager GUI to an application user, wherein the interface manager GUI provides a platform to configure the elements of the GUI, and wherein the elements of the GUI have default settings specified by at least one interface control file;
receive user input via the interface manager GUI that specifies at least one desired interface configuration change to the default settings for a desired release of at least one application; and
create at least one overlay file that, when processed by a computer, implements the desired interface configuration change, while retaining backward compatibility with each application when the interface configuration change implemented by a particular one of the at least one overlay file is selectively reset such that the default settings are restored, wherein changes in the at least one overlay file are processed in chronological order,
wherein the at least one overlay file includes a different filename suffix than the at least one interface control file, wherein the different filename suffix prevents a different release of the at least one application from processing the at least one overlay file.

21. The system of claim 20 wherein the overlay file is created by one of a software vendor, a user group, and an individual application user.

22. The system of claim 20 wherein the desired interface configuration change comprises at least one of: deleting an interface element, hiding an interface element, adding an interface element, modifying an interface element, deleting a toolbar, deleting a toolbar button, hiding a toolbar, hiding a toolbar button, reordering a toolbar button within a toolbar, moving a toolbar button to another toolbar, adding a toolbar, adding a toolbar button, changing a toolbar button icon, and changing a toolbar button callback.

23. The system of claim 20 wherein the overlay file avoids a collision with an existing interface control file by at least one of a separate storage location, a separate filename, and the different filename suffix.

24. The system of claim 20 wherein backward compatibility is retained by at least one of: processing existing interface control files prior to processing overlay files, processing overlay files according to a predetermined ordering algorithm, and limiting desired interface configuration changes involving deletions of an interface element.

25. The system of claim 20 wherein the overlay file is one of a SKILL file and an Extensible Markup Language (XML) file, and the application is an electronic design automation (EDA) program.

26. The system of claim 20 wherein the interface manager GUI receives user input that specifies at least one desired interface configuration change for at least two applications, and wherein a first one of the at least two applications provides a first default set of electronic design automation (EDA) tool elements for the GUI, and wherein a second one of the at least two applications provides a second default set of EDA tool elements for the GUI, wherein both the first default set of EDA tool elements and the second default set of EDA tool elements interact with a circuit design under a development portion of the GUI according to respective callback functions when selected by the application user.

27. The system of claim 26 wherein the respective callback functions are commands to implement an associated function in the circuit design under a development portion of the GUI.

* * * * *